US012793524B2

(12) United States Patent
Nakajima

(10) Patent No.: US 12,793,524 B2
(45) Date of Patent: Nov. 10, 2026

(54) ITEM MANAGEMENT SYSTEM, METHOD, AND READING APPARATUS

(71) Applicant: CANON KABUSHIKI KAISHA, Tokyo (JP)

(72) Inventor: Yuki Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 18/606,386

(22) Filed: Mar. 15, 2024

(65) Prior Publication Data

US 2024/0221480 A1 Jul. 4, 2024

Related U.S. Application Data

(63) Continuation of application No. PCT/JP2022/029788, filed on Aug. 3, 2022.

(30) Foreign Application Priority Data

Oct. 6, 2021 (JP) ................................ 2021-164936

(51) Int. Cl.
*G01S 5/14* (2006.01)
*G01C 5/06* (2006.01)
(Continued)

(52) U.S. Cl.
CPC ........... *G08B 13/2462* (2013.01); *G01C 5/06* (2013.01); *G01C 21/206* (2013.01); *G01S 5/0036* (2013.01); *G01S 5/14* (2013.01)

(58) Field of Classification Search
CPC ........ G01C 5/06; G01C 21/206; G01C 21/20; G01C 21/1654; G01C 9/00; G01C 21/005;
(Continued)

(56) References Cited

U.S. PATENT DOCUMENTS 9,967,701 B1 * 5/2018 Barfield, Jr. ........... G01C 21/20
2013/0132017 A1 * 5/2013 Hiltunen ................ G16Z 99/00 702/94
(Continued)

FOREIGN PATENT DOCUMENTS

CN 111126520 A 5/2020
CN 112270388 A 1/2021
(Continued)

OTHER PUBLICATIONS

International Search Report and Written Opinion of the International Searching Authority for International Patent Application No. PCT/JP2022/029788.

*Primary Examiner* — Dionne Pendleton
(74) *Attorney, Agent, or Firm* — Venable LLP

(57) ABSTRACT

There is provided an item management system including: at least one first wireless device installed at a known position and storing first identification information; a second wireless device attached to an item and storing second identification information; at least one reading apparatus that moves together with a mobile object and includes a reading unit capable of reading, from a wireless device, identification information stored in the wireless device; and a gauging unit configured to gauge air pressure; and an estimation unit configured to estimate a position of the item in a height direction based on a first air pressure value gauged when reading the first identification information from the at least one first wireless device and a second air pressure value gauged when reading the second identification information from the second wireless device.

15 Claims, 24 Drawing Sheets

(51) Int. Cl.

| | |
|---|---|
| ***G01C 21/20*** | (2006.01) |
| ***G01S 5/00*** | (2006.01) |
| ***G08B 13/24*** | (2006.01) |

(58) Field of Classification Search

CPC .... G01C 21/165; G01C 21/188; G01C 21/26; G01C 22/00; G01C 5/005; H04W 4/029; H04W 4/70; H04W 4/02; H04W 4/021; H04W 4/35; H04W 4/38; H04W 4/42; H04W 84/18; B60C 23/0416; B60C 23/0459; B60C 23/0488; B60C 23/0489; B60C 23/0408; B60C 23/0483; G01S 19/34; G01S 19/20; G01S 19/47; G01S 19/51; G01S 5/0027; G01S 5/0247; G01S 5/02585; G01S 5/12; G01S 17/875; G01S 19/41; G01S 19/425; G01S 19/44; G01S 19/45; G01S 19/48; G01S 19/49; G01S 19/53; G01S 2205/03; G01S 2205/07; G01S 3/14; G01S 5/0205; G01S 5/021; G01S 5/0244; G01S 5/0268; G01S 5/0295; G01S 5/04; G01S 5/06; G01S 5/163; G01S 1/68; G01M 17/02; G04G 21/02; G05D 1/0825; G06Q 10/06; G06Q 10/08; G06Q 10/087; G08B 21/043; G08B 21/0446; G08B 13/2462; G08G 1/20; G08G 1/096716; G08G 1/09675; G08G 1/096791; G08G 1/162; G08G 5/26; G08G 1/16; G08G 5/21; G08G 5/25; G08G 5/53; G08G 5/55; G08G 5/723; G08G 5/80; H04L 67/12; H04L 67/125; H04L 67/52; B60T 7/12; B60T 7/16; B64D 47/00; G01L 13/00; G01L 19/12; G01L 27/002; G06F 17/40; H04M 1/72454; H04M 1/72457; H04M 1/72463; H04M 2242/30; G06K 7/10; G06K 7/10297; B65G 1/137; B65G 61/00; H02J 7/485; Y02E 60/10; H04N 23/20

See application file for complete search history.

(56) References Cited

U.S. PATENT DOCUMENTS

| | | | | |
|---|---|---|---|---|
| 2017/0261592 | A1* | 9/2017 | Min | G01S 5/0264 |
| 2020/0049854 | A1* | 2/2020 | Hamidifar | H04W 88/085 |
| 2022/0326719 | A1* | 10/2022 | Ji | G01C 21/206 |
| 2024/0062597 | A1 | 2/2024 | Fujii et al. | |
| 2024/0176964 | A1 | 5/2024 | Murofushi et al. | |

FOREIGN PATENT DOCUMENTS

| | | | |
|---|---|---|---|
| JP | 6811663 | B2 | 1/2021 |
| WO | 2020/059236 | A1 | 3/2020 |

* cited by examiner

FIG. 4A

310

| TAG ID (311) | ITEM D (312) | NAME (313) | TYPE (314) |
|---|---|---|---|
| TG01 | IT01 | ITEM A | Type1 |
| TG02 | IT02 | ITEM B | Type1 |
| TG03 | IT03 | ITEM C | Type2 |
| : | : | : | : |

FIG. 4B

320

| TAG ID (321) | INSTALLATION HEIGHT (322) | FLOOR (323) |
|---|---|---|
| TGA | Ha | PL01 |
| TGB | Hb | PL03 |
| : | : | : |

FIG. 4C

330

| FLOOR ID (331) | FLOOR NUMBER (332) | HEIGHT (333) |
|---|---|---|
| PL01 | 1 | h1 |
| PL02 | 2 | h2 |
| PL03 | 3 | h3 |
| : | : | : |

FIG. 5A

350

| # (351) | READER ID (352) | READING TIME (353) | TAG ID (354) | AIR PRESSURE (355) |
|---|---|---|---|---|
| 1 | RD01 | T02 | TG01 | P02 |
| 2 | RD01 | T04 | TG02 | P04 |
| 3 | RD02 | T06 | TG01 | P06 |
| : | : | : | : | : |

FIG. 5B

360

| # (361) | READER ID (362) | READING TIME (363) | TAG ID (364) | AIR PRESSURE (365) |
|---|---|---|---|---|
| 1 | RD01 | T01 | TGA | P01 |
| 2 | RD01 | T03 | TGB | P03 |
| 3 | RD02 | T05 | TGA | P05 |
| : | : | : | : | : |

FIG. 5C

370

| # (371) | ITEM (372) | DETECTION TIME (373) | HEIGHT (374) | FLOOR (375) |
|---|---|---|---|---|
| 1 | IT01 | T02 | H2 | 2 |
| 2 | IT02 | T04 | Hn | n |
| 3 | IT01 | T06 | H2 | 2 |
| : | : | : | : | : |

FIG. 15A

420

| TAG ID (321) | INSTALLATION POSITION (422) | FLOOR (323) |
|---|---|---|
| TGA | (Ua, Va, Ha) | PL01 |
| TGB | (Ub, Vb, Hb) | PL03 |
| : | : | : |

FIG. 15B

430

| FLOOR ID (331) | FLOOR NUMBER (332) | HEIGHT (333) | MAP IMAGE (434) | SCALE (435) |
|---|---|---|---|---|
| PL01 | 1 | h1 | MAP1 | SC1 |
| PL02 | 2 | h2 | MAP2 | SC2 |
| PL03 | 3 | h3 | MAP3 | SC2 |
| : | : | : | : | : |

FIG. 16A

450

| # (351) | READER ID (352) | READING TIME (353) | TAG ID (354) | AIR PRESSURE (355) | MOVEMENT AMOUNT (456) |
|---|---|---|---|---|---|
| 1 | RD01 | T02 | TG01 | P02 | (X2, Y2, Z2) |
| 2 | RD01 | T04 | TG02 | P04 | (X4, Y4, Z4) |
| 3 | RD02 | T06 | TG01 | P06 | (X6, Y6, Z6) |
| : | : | : | : | : | : |

FIG. 16B

460

| # (361) | READER ID (362) | READING TIME (363) | TAG ID (364) | AIR PRESSURE (365) | MOVEMENT AMOUNT (466) |
|---|---|---|---|---|---|
| 1 | RD01 | T01 | TGA | P01 | (X1, Y1, Z1) |
| 2 | RD01 | T03 | TGB | P03 | (X3, Y3, Z3) |
| 3 | RD02 | T05 | TGA | P05 | (X5, Y5, Z5) |
| : | : | : | : | : | : |

FIG. 16C

470

| # (371) | ITEM (372) | DETECTION TIME (373) | POSITION (474) | FLOOR (375) |
|---|---|---|---|---|
| 1 | IT01 | T02 | (U2, V2, H2) | SECOND FLOOR |
| 2 | IT02 | T04 | (U4, V4, H4) | N-th FLOOR |
| 3 | IT01 | T06 | (U6, V6, H6) | SECOND FLOOR |
| : | : | : | : | : |

FIG. 22A

630

| FLOOR ID (331) | FLOOR NUMBER (332) | HEIGHT (333) | BUILDING (634) |
|---|---|---|---|
| PL01 | 1 | h1 | BD01 |
| PL02 | 2 | h2 | BD01 |
| PL03 | 3 | h3 | BD01 |
| : | : | : | : |

FIG. 22B

640

| BUILDING ID (641) | LOCATION (642) | NAME (643) |
|---|---|---|
| TG01 | (LO1, LA1) | FACILITY A |
| TG02 | (LO2, LA2) | FACILITY B |
| TG03 | (LO3, LA3) | FACILITY C |
| : | : | : |

ITEM MANAGEMENT SYSTEM, METHOD, AND READING APPARATUS

CROSS-REFERENCE TO RELATED APPLICATIONS

This application is a Continuation of International Patent Application No. PCT/JP2022/029788, Aug. 3, 2022, which claims the benefit of Japanese Patent Application No. 2021-164936, filed Oct. 6, 2021, both of which are hereby incorporated by reference herein in their entirety.

BACKGROUND OF THE INVENTION

Field of the Invention

The present disclosure relates to an item management system, a method, and a reading apparatus.

Background Art

Radio frequency identification (RFID) is a technology that allows information embedded in a small device which is also referred to as a tag to be read by an external reader through short-range wireless communication. For example, an RFID tag in which unique identification information is embedded is attached to an item so that a location of the item can be efficiently known in item stock and distribution management and that visualization of information on managed items becomes easier. Among others, a passive type RFID tag, which transmits information utilizing energy of electromagnetic wave emitted from a reader, does not require a battery, leading to low manufacturing cost and semipermanent operation. Hence, it has become widely-used not only in the stock and distribution management but also in various applications.

PTL 1 discloses an example of a system which makes use of RFID tags for assisting management of indoor item locations. In the system of PTL 1, a tag reader on which an air pressure sensor is mounted (also referred to as wireless tag master) is installed on each floor of a building in order to get to know a position of an item including a position in a height direction. Then, the position of the item in the height direction is calculated based on an air pressure value at a point in time when the tag reader has detected an RFID tag attached to the item, and a distance between the tag reader and the item is calculated based on a value of received power of a wireless signal.

CITATION LIST

Patent Literature

PTL 1: Japanese Patent No. 6811663

However, the way to install the tag reader on each floor of a building requires the same number of expensive tag readers as the number of floors of the building, which leads to an increased cost as the building becomes taller. Moreover, in a situation where an item can move within a space which is spacious to some extent in a horizontal direction, a reading range of one tag reader cannot cover one floor, and it will be difficult to get to know a position of the item in the horizontal direction. Though this issue can be solved by installing several tag readers on one floor, such a solution would further exacerbate the cost.

In light of the foregoing, the present invention aims at providing a mechanism that allows for getting to efficiently know a position of an item in a height direction while suppressing a cost.

SUMMARY OF THE INVENTION

According to an aspect, there is provided an item management system including: at least one first wireless device installed at a known position and storing first identification information; a second wireless device attached to an item and storing second identification information; at least one reading apparatus that moves together with a mobile object and includes a reading unit capable of reading, from a wireless device, identification information stored in the wireless device and a gauging unit configured to gauge air pressure; and an estimation unit configured to estimate a position of the item in a height direction based on a first air pressure value gauged when the at least one reading apparatus has read the first identification information from the at least one first wireless device and a second air pressure value gauged when the at least one reading apparatus has read the second identification information from the second wireless device. A corresponding method and a reading apparatus are also provided.

Further features of the present invention will become apparent from the following description of exemplary embodiments with reference to the attached drawings.

BRIEF DESCRIPTION OF THE DRAWINGS

FIG. 4A is an explanatory diagram illustrating an example of a configuration of an item table according to the first embodiment.

FIG. 4B is an explanatory diagram illustrating an example of a configuration of a position tag table according the first embodiment.

FIG. 4C is an explanatory diagram illustrating an example of a configuration of a floor table according to the first embodiment.

FIG. 5A is an explanatory diagram illustrating an example of a configuration of an item reading table according to the first embodiment.

FIG. 5B is an explanatory diagram illustrating an example of a configuration of a position reading table according the first embodiment.

FIG. 5C is an explanatory diagram illustrating an example of a configuration of an estimation result table according to the first embodiment.

FIG. 15A is an explanatory diagram illustrating an example of a configuration of a position tag table according the second embodiment.

FIG. 15B is an explanatory diagram illustrating an example of a configuration of a floor table according to the second embodiment.

FIG. 16A is an explanatory diagram illustrating an example of a configuration of an item reading table according to the second embodiment.

FIG. 16B is an explanatory diagram illustrating an example of a configuration of a position reading table according the second embodiment.

FIG. 16C is an explanatory diagram illustrating an example of a configuration of an estimation result table according to the second embodiment.

FIG. 22A is an explanatory diagram illustrating an example of a configuration of a floor table according to the third embodiment.

FIG. 22B is an explanatory diagram illustrating an example of a configuration of a building table according to the third embodiment.

BRIEF DESCRIPTION OF THE EMBODIMENTS

Figure 1:
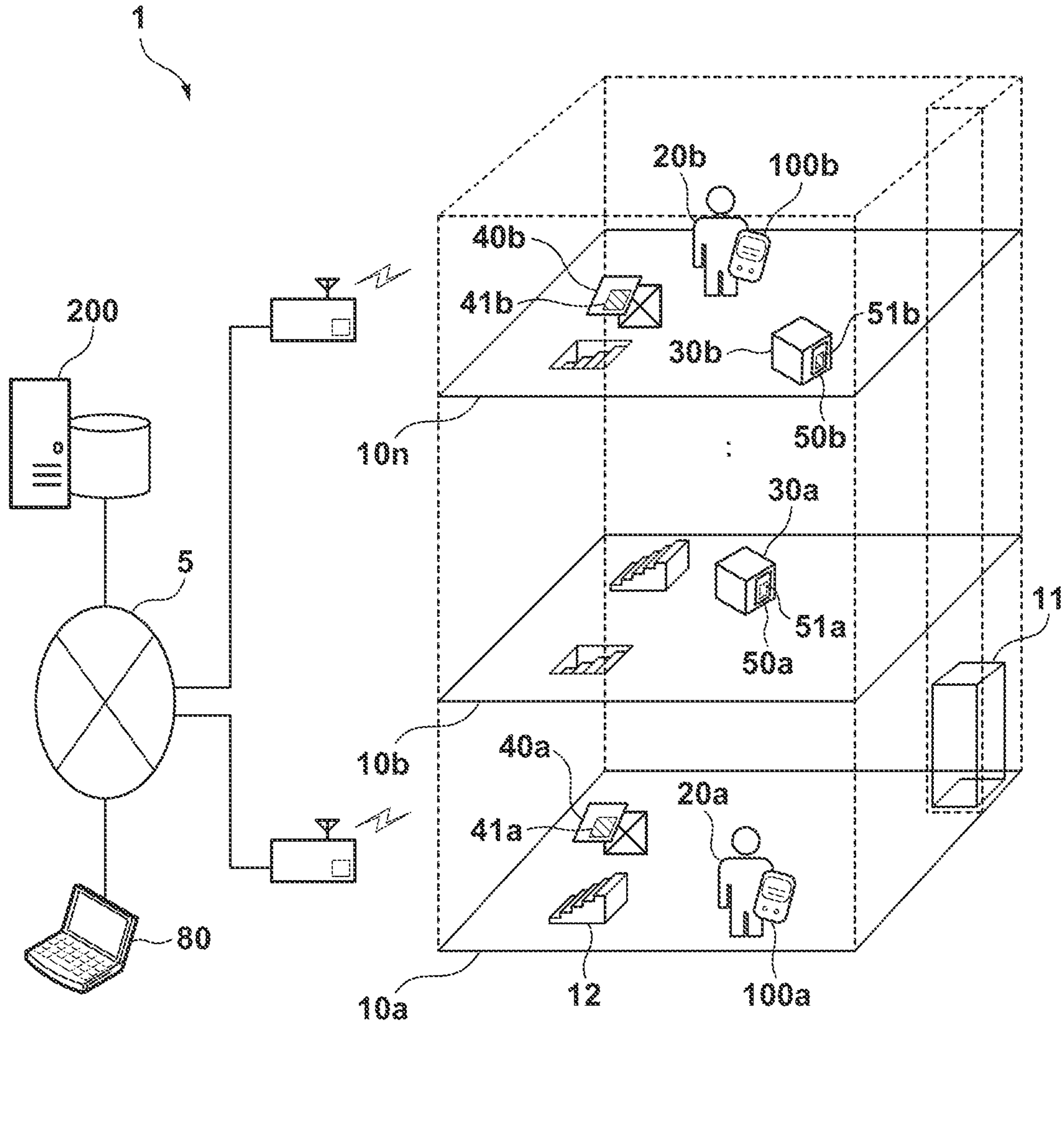
FIG. 1 is a schematic view illustrating an example of a configuration of an item management system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. First Embodiment

<1-1. System Overview>

FIG. 1 is a schematic view illustrating an example of a configuration of an item management system 1 according to a first embodiment. The item management system 1 is a system for managing a location of each of one or more items. In the present embodiment, a location of an item may be managed as information indicating on which floor the item exits in a building that consists of a plurality of floors. The information of locations of items may be provided to a user or another information system, and employed for various purposes such as inventory management, distribution management, construction management, safety management, or preparation of a work plan, for example.

FIG. 1 illustrates a plurality of floors 10*a*, 10*b*, . . . , 10*n* of a building. There exists a user 20*a* on the floor 10*a*. There exists a user 20*b* on the floor 10*n*. In the following descriptions, the floors 10*a*, 10*b*, . . . , 10*n* are collectively referred to as floors 10 by omitting the trailing letters from the reference signs when they do not need to be distinguished from each other. The same applies to the users 20 (user 20*a*, 20*b*, . . . ) as well as any other elements. The number of floors 10 of a building and the number of users 20 who utilize the item management system 1 are not limited to the example illustrated in FIG. 1 but may be any numbers. The users 20 can freely move across the floors 10*a*, 10*b*, . . . , 10*n* by utilizing the elevator 11 and the staircase 12.

In the example of FIG. 1, there exists an item 30*a* on the floor 10*b*. There exists an item 30*b* on the floor 10*n*. The items 30 may be non-living objects (for example, machines, equipment, tools, materials, consumable goods, components, vehicles, or robots) or living objects (for example, animals or plants).

The item management system 1 makes use of wireless devices, which are also referred to as tags, for the purpose of item management. In the present embodiment, the item management system 1 includes two types of tags. A first type of tags (first wireless devices) are position tags installed at known positions in a building. A second type of tags (second wireless devices) are item tags which are attached to respective items managed in the item management system 1.

In the example of FIG. 1, there is a position tag 40*a* installed on the floor 10*a*, and a position tag 40*b* installed on the floor 10*n*. The installation position of each of the position tags 40 may be fixed or can be changed. Item tags 50*a* and 50*b* are attached to the items 30*a* and 30*b*, respectively. Each of item tags 50 moves as a corresponding item moves.

In the present embodiment, each of the tags such as the position tags 40 and the item tags 50 is assumed to be a passive-type RFID tag (a passive tag). A passive tag is composed of: a small integrated circuit (IC) chip with an embedded memory; and an antenna, and has identification information for identifying the tag and some other information stored in the memory. In this specification, identification information is simply referred to as an ID, and identification information for identifying a tag is referred to as a tag ID. It should be noted that the tag ID may be considered as information for identifying an object to which the tag is attached. The IC chip of a passive tag operates by utilizing energy of an electromagnetic wave emitted from a tag reader, and modulates the information such as the tag ID and some other information stored in the memory into an information signal to transmit (send back) the information signal from the antenna.

In the example of FIG. 1, the item tags 50*a* and 50*b* have specific tag IDs 51*a* and 51*b* embedded in the tags, respectively. The tag ID 51 (second identification information) of each item tag 50 is associated with the item 30 to which the item tag 50 is attached in a database described below. The position tags 40*a* and 40*b* also have respective specific tag IDs embedded in the tags. The tag ID of each position tag 40 is associated with the known installation position of that position tag 40.

It should be noted that, in another embodiment, each tag may be an active-type RFID tag. If each tag actively (for example, periodically) transmits information to its vicinity by utilizing power from a built-in battery, such a tag may be called a beacon tag. In a further embodiment, each tag may be a wireless device which sends back information in response to a signal from a reader in accordance with Near Field Communication (NFC) protocol or Bluetooth (registered trademark) protocol, for example. Each tag may have any name such as an IC tag, an IC card, or a responder.

The user 20*a* carries a tag reader 100*a*. The user 20*b* carries a tag reader 100*b*. Note that, in this specification, the expression that a user carries a certain target should broadly comprehend various modes in which the user moves together with the target (for example, moves in a state where he or she holds or wears the target, etc.). The item management system 1 includes at least one such tag reader 100, a management server 200, and a terminal apparatus 80. The tag readers 100, the management server 200, and the terminal apparatus 80 are connected to a network 5. The network 5 may be a wired network, a wireless network, or any combination thereof. Examples of the network 5 may include the Internet, an intranet, and a cloud network.

The tag reader 100 is a reading apparatus that is capable of reading, from wireless devices such as RFID tags, information stored in the wireless devices. The tag reader 100 can detect an item 30 to which an item tag 50 is attached by reading a tag ID 51 from the item tag 50, for example. Likewise, the tag reader 100 can detect a position tag 40 by reading a tag ID from the position tag 40. In addition, in the present embodiment, the tag reader 100 has an air pressure gauging function, and gauges air pressure when reading tags. Such an attempt of tag reading and gauging of air pressure may be performed periodically or in response to a certain trigger such as a user operation. Then, the tag reader 100 transmits a tag reading result including a gauged air pressure value to the management server 200. The tag reader 100 may be capable of communicating with the management server 200 directly or indirectly via a certain relay apparatus (for example, an information terminal carried by the user 20, or the like). An example of a particular configuration of the tag reader 100 will be further described below.

Note that, though an example where a user 20 carries a tag reader 100 is mainly described, the tag reader 100 is not limited to this example and may move in a building together with any type of a mobile object. Mobile objects may include humans, vehicles, robots and drones, for example.

The management server 200 is an information processing apparatus that manages information regarding locations of a plurality of items 30 in a database. The management server 200 may be implemented as an application server, a database server, or a cloud server by using a high-end general-purpose computer, for example. The management server 200 receives tag reading results from the tag reader 100, and updates the database based on the received tag reading results. An example of a particular configuration of the management server 200 will be further described below.

Though a single management server 200 is illustrated in FIG. 1, the functions of the management server 200, which will be described in detail below, may be provided by a single apparatus or by physically-separate multiple apparatuses which operate in conjunction with each other. In addition, though an example where the management server 200 maintains a database will be described in the present embodiment, an apparatus other than the management server 200 may maintain a part or all of the database. For example, a part of data may be maintained by a wireless device or a tag reader 100.

The terminal apparatus 80 is an information processing apparatus that is used by a user 20 or a manager of the item management system 1. The terminal apparatus 80 may be a general-purpose terminal such as a personal computer (PC) or a smartphone, or a dedicated terminal specialized for an item management purpose. The terminal apparatus 80 may be portable or stationary. The terminal apparatus 80 typically comprises an input device that accepts user inputs, a communication interface that communicates with other apparatuses (for example, the management server 200), and a display device that displays information. As an example, the terminal apparatus 80 is used by a user 20 or a manager when browsing information provided from the management server 200.

It should be noted that, though FIG. 1 illustrates the tag reader 100 and the terminal apparatus 80 as separate apparatuses, there may be provided an integrated apparatus which has both of functionalities of the tag reader 100 and the terminal apparatus 80. The terminal apparatus 80 may be carried by a user 20 and may relay communication between the tag reader 100 and the management server 200. Moreover, the functions of the management server 200 described in the present specification may be realized within the terminal apparatus 80.

<1-2. Configuration Example of Tag Reader>

Figure 2:
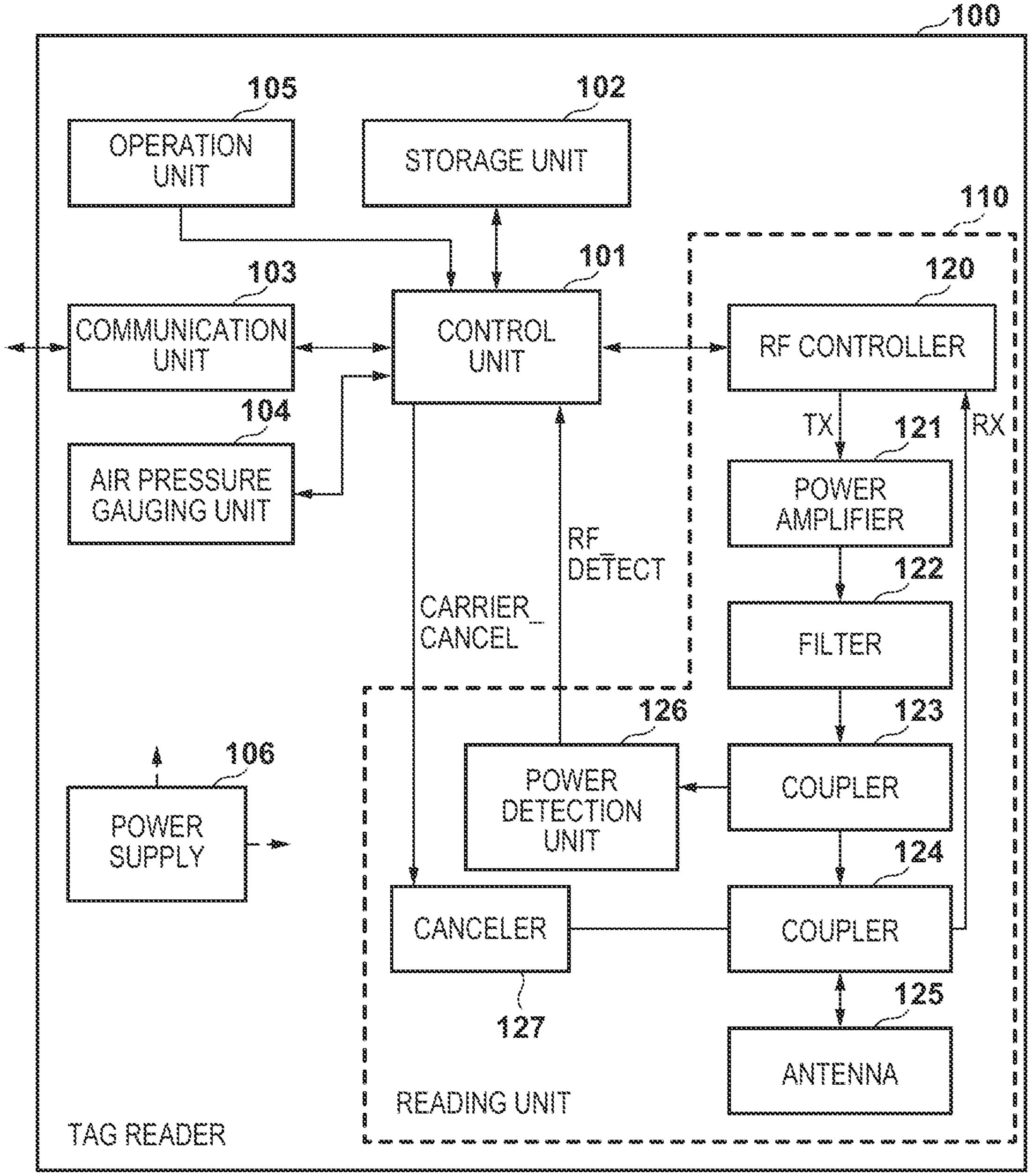
FIG. 2 is a block diagram illustrating an example of a configuration of a tag reader according to the first embodiment.

FIG. 2 is a block diagram illustrating an example of a configuration of the tag reader 100 according to the present embodiment. With reference to FIG. 2, the tag reader 100 includes a control unit 101, a storage unit 102, a communication unit 103, an air pressure gauging unit 104, an operation unit 105, a power supply 106, and a reading unit 110.

The control unit 101 consists of a memory to store computer programs, and one or more processors (for example, central processing units (CPUs)) to execute the computer programs. The control unit 101 controls overall functionality of the tag reader 100 described in this specification. For example, the control unit 101 causes the reading unit 110 to attempt reading from an RFID tag within a tag reading range. Upon detecting an RFID tag by the reading unit 110, the control unit 101 causes the air pressure gauging unit 104 to gauge atmospheric pressure at that point in time. Then, the control unit 101 causes the storage unit 102 to temporarily store the information read from the RFID tag, the time of the reading, and the gauged air pressure value as reading result data. After that, the control unit 101 reads out the reading result data from the storage unit 102, and transmits it together with reader identification information (also referred to as a reader ID) that identifies the apparatus itself to the management server 200 via the communication unit 103.

The storage unit 102 may include any kind of storage medium such as a semiconductor memory (a read only memory (ROM), a random access memory (RAM), or the like), an optical disk, or a magnetic disk, for example. In the present embodiment, the storage unit 102 stores the above-described reading result data, and the reader ID of the tag reader 100.

The communication unit 103 is a communication interface for the tag reader 100 to communicate with the management server 200. For example, the communication unit 103 may be a wireless local area network (WLAN) interface that communicates with a WLAN access point, or a cellular communication interface that communicates with a cellular base station. Alternatively, the communication unit 103 may be a connection interface (e.g. a Bluetooth (registered trademark) interface or a universal serial bus (USB) interface) for connection with a relay apparatus.

The air pressure gauging unit 104 is an air pressure sensor that can gauge atmospheric pressure. When instructed to gauge air pressure from the control unit 101, the air pressure gauging unit 104 gauges air pressure, and outputs air pressure data indicating the gauged air pressure value to the control unit 101. Note that, though FIG. 2 illustrates an example where the tag reader 100 includes the air pressure gauging unit 104, the air pressure gauging unit 104 may be included in an external device that is capable of communicating with a tag reader 100 and is carried by a user 20 along with the tag reader 100. In that case, the tag reader 100 receives, from the external device, an air pressure value gauged by the air pressure gauging unit 104.

The operation unit 105 detects a user operation. The operation unit 105 includes physical input devices such as a button, a switch, or a lever disposed on a housing of the tag reader 100, for example. The operation unit 105 detects an operation by the user 20 through an input device, and outputs an operation signal to the control unit 101. In addition, the operation unit 105 may include an audio input interface such as a microphone.

The power supply 106 includes a battery and a DC-DC converter, and supplies power for operating electronic circuits of the control unit 101, the storage unit 102, the communication unit 103, the air pressure gauging unit 104, the operation unit 105, and the reading unit 110 of the tag reader 100. The battery may include a primary cell, or a rechargeable secondary cell. Although not illustrated in the figure, the tag reader 100 may have a connection terminal for connecting the tag reader 100 to an external power source for recharging the power supply 106.

The reading unit 110 is a unit that is capable of reading, from each of the tags such as the position tags 40, and the item tags 50 described above, information stored in the tag. With reference to FIG. 2, the reading unit 110 includes an RF controller 120, a power amplifier 121, a filter 122, a first coupler 123, a second coupler 124, an antenna 125, a power detector 126, and a canceler 127. The RF controller 120 outputs a transmission signal (for example, a signal modulated in the UHF band) from a TX terminal to the power amplifier 121 in accordance with control by the control unit 101. The power amplifier 121 amplifies the transmission signal input from the RF controller 120 to output it to the filter 122. The amplification rate of the transmission signal here may be controllable in variable manner, and a higher amplification rate will enhance an output strength of an electromagnetic wave emitted from the tag reader 100. The filter 122 may be a low-pass filter, for example, and filters out unnecessary frequency components from the transmission signal amplified by the power amplifier 121. The first coupler 123 distributes the transmission signal that has passed the filter 122 to the coupler 124 and the power detector 126. The second coupler 124 outputs the transmission signal input from the first coupler 123 to the antenna 125, and outputs a received signal input from the antenna 125 to the RF controller 120. The antenna 125 transmits the transmission signal input from the coupler 124 to the air as an electromagnetic wave. Further, the antenna 125 receives a signal that has been sent back from an RFID tag that exists within the reading range of the tag reader 100 in response to the transmission signal, and outputs the received signal to the coupler 124. The power detector 126 detects a power level of the signal input from the first coupler 123, and outputs a signal 'RF_DETECT' indicative of the detected power level to the control unit 101. The canceler 127 receives a signal 'CARRIER_CANCEL' indicative of a power level of a carrier from the control unit 101. Then, the canceler 127 extracts an intended signal component of the received signal to be output to an RX terminal of the RF controller 120 by canceling the carrier component of the transmission signal based on the CARRIER_CANCEL. The RF controller 120 demodulates the signal input from the RX terminal to obtain a tag ID and other information sent back from the RFID tag, and outputs the obtained information to the control unit 101.

The reading unit 110 can attempt tag reading periodically (for example, once per second) without requiring any explicit command from a user. Data transmission from the communication unit 103 to the management server 200 can also be performed periodically (for example, every few seconds) or whenever the tag reading is done without requiring any explicit command from a user. The control unit 101 may exclude, from the data to be transmitted, the same record as the most recent record that has already been transmitted in a predetermined time period to omit redundant data transmission and reduce a communication load. When a reception level of a received signal from an RFID tag exceeds a preset minimum detection level, the control unit 101 may determine to have detected the RFID tag, and transmit a reading result data about the detected RFID tag to the management server 200. Noted that, in another embodiment, one or both of an attempt of tag reading by the reading unit 110 and data transmission to the management server 200 may be performed in response to detecting a user input via the operation unit 105. In a case where the communication unit 103 performs communication with the management server 200 indirectly via a relay apparatus, the data transmission to the management server 200 may be performed only while there is an effective connection between the communication unit 103 and the relay apparatus.

<1-3. Configuration Example of Management Server>

<1-3-1. Basic Configuration>

Figure 3:
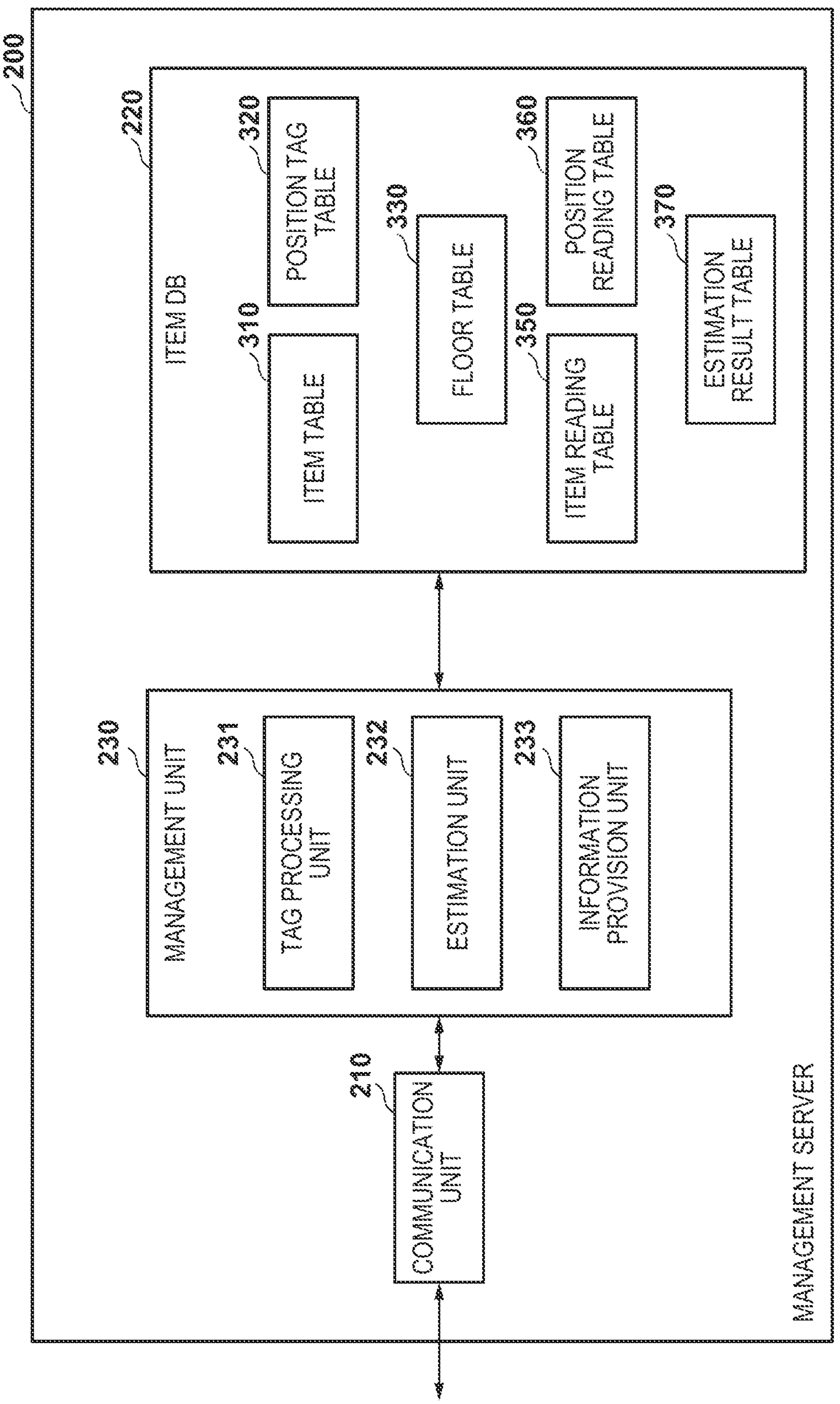
FIG. 3 is a block diagram illustrating an example of a configuration of a management server according to the first embodiment.

FIG. 3 is a block diagram illustrating an example of a configuration of the management server 200 according to the present embodiment. With reference to FIG. 3, the management server 200 includes a communication unit 210, an item database (DB) 220, and a management unit 230.

The communication unit 210 is a communication interface for the management server 200 to communicate with other apparatuses. The communication unit 210 may be a wired communication interface or a wireless communication interface. In the present embodiment, the communication unit 210 communicates with the tag readers 100 and the terminal apparatus 80. The item DB 220 is a database that stores information regarding a location of each of the plurality of items under management of the system. In the present embodiment, the item DB 220 includes an item table

310, a position tag table 320, a floor table 330, an item reading table 350, a position reading table 360, and an estimation result table 370. The management unit 230 is a set of software modules that provide management functions for managing data within the item DB 220. The individual software modules can run by one or more processors (not shown) of the management server 200 executing computer programs stored in a memory (not shown). In the present embodiment, the item management unit 230 includes a tag processing unit 231, an estimation unit 232, and an information provision unit 233.

<1-3-2. Data Configuration Examples>

FIGS. 4A to 4C illustrate respective configuration examples of the item table 310, the position tag table 320, and the floor table 330 of the item DB 220.

The item table 310 has four data elements, namely, Tag ID 311, Item ID 312, Name 313, and Type 314. Tag ID 311 is identification information that uniquely identifies an item tag 50 attached to each of the items 30. The value of Tag ID 311 is the same as the value of the tag ID stored within the corresponding item tag 50. Item ID 312 is identification information that uniquely identifies each item 30. Name 313 represents a name of each item 30. In the example of FIG. 4A, the items identified by item IDs "IT01", "IT02", and "IT03" are given the names of "Item A", "Item B", and "Item C", respectively. Herein, "Item A" may correspond to the item 30*a* illustrated in FIG. 1, and "Item B" may correspond to the item 30*b* illustrated in FIG. 1, respectively. Type 314 represents a type into which each item 30 is classified. In the example of FIG. 4A, the type of "Item A" and "Item B" is "Type 1", and the type of "Item C" is "Type 2".

The position tag table 320 has three data elements, namely Tag ID 321, Installation Height 322, and Floor 323. Tag ID 321 is identification information that uniquely identifies each position tag 40. The value of Tag ID 321 is the same as the value of the tag ID stored within the corresponding position tag 40. Installation Height 322 represents the height with respect to a reference plane (typically the ground surface) of the installation position of each position tag 40. Floor 323 represents the floor where each position tag 40 is installed, using the value of Floor ID 331 in the floor table 330 (described below). In the example in FIG. 4B, the position tag 40*a* identified by a tag ID "TGA" is installed on the first floor identified by a floor ID "PL01", and the position tag 40*b* identified by a tag ID "TGB" is installed on the third floor identified by a floor ID "PL03".

The floor table 330 has three data elements, namely Floor ID 331, Floor Number 332, and Height 333. Floor ID 331 is identification information that uniquely identifies each of floors 10 of a given building. Floor Number 332 is a number indicating what number floor each floor 10 is, counting from the ground floor. The floor table 330 may include, instead of or in addition to Floor Number 332, a data element representing the name of each floor 10 (for example, "first floor", "ground floor", "rooftop", "basement first floor", or the like). Height 333 represents the height of the floor surface of each floor 10 from the reference plane.

The data of the item table 310, the position tag table 320, and the floor table 330 are determined by a user 20 or a manager, and may be registered in advance through a user interface provided by the management unit 230. Some of the data (for example, the name and type of the item 30, the installation height and floor of the position tag 40, or the like) may be stored in the position tag 40 or the item tag 50 in advance and read by the tag reader 100. The data read by the tag reader 100 may be transmitted from the tag reader 100 to the management server 200 and registered in the corresponding table.

FIGS. 5A to 5C illustrate examples of the configurations of the item reading table 350, the position reading table 360, and the estimation result table 370, respectively.

The item reading table 350 is a table for storing records of data for the item tags 50 (hereinafter, referred to as "item reading records") from among the reading result data received from each tag reader 100. The item reading table 350 has five data elements, namely Record Number 351, Reader ID 352, Reading Time 353, Tag ID 354, and Air Pressure 355. Record Number 351 is a number for uniquely identifying each item reading record. Reader ID 352 is identification information that identifies the tag reader 100 that has read the tag for each item reading record. Reading Time 353 indicates the time at which the tag ID has been read for each item reading record. Tag ID 354 indicates the tag ID that has been read for each item reading record. Air Pressure 355 indicates the air pressure value gauged by the air pressure gauging unit 104 of the tag reader 100 when the tag was read. For example, the first record in FIG. 5A indicates that the tag reader 100 identified by the reader ID "RD01" read the tag ID "TG01" at time "T02", and the air pressure value gauged at the same point at that time was "P02".

The position reading table 360 is a table for storing records of data for the position tags 40 (hereinafter, referred to as "position reading records") from among the reading result data received from each tag reader 100. The position reading table 360 has five data elements, namely Record Number 361, Reader ID 362, Reading Time 363, Tag ID 364, and Air Pressure 365. Record Number 361 is a number for uniquely identifying each position reading record. Reader ID 362 is identification information that identifies the tag reader 100 that has read the tag for each position reading record. Reading Time 363 indicates the time at which the tag ID has been read for each position reading record. Tag ID 364 indicates the tag ID that has been read for each position reading record. Air Pressure 365 indicates the air pressure value gauged by the air pressure gauging unit 104 of the tag reader 100 when the tag was read. For example, the first record in FIG. 5B indicates that the tag reader 100 identified by the reader ID "RD01" read the tag ID "TGA" at time "T01", and the air pressure value gauged at the same point at that time was "P01".

The estimation result table 370 is a table for storing an estimation result for the position in a height direction of each of the items 30 detected by each tag reader 100. The estimation result table 370 has five data elements, namely Record Number 371, Item 372, Detection Time 373, Height 374, and Floor 375. Record Number 371 is a number for uniquely identifying each estimation result record. Item 372 represents the item 30 detected for each estimation result record (the item 30 for which the corresponding item tag 50 has been read) by a value of Item ID 312 in the item table 310. Detection Time 373 indicates the time at which the item 30 has been detected for each estimation result record. The value of Detection Time 373 may be the same as the value of Reading Time 353 of the corresponding item reading record in the item reading table 350. Height 374 indicates a height estimated by the estimation unit 232 (described below) for each estimation result record. Here, the height may be an absolute height (for example, sea level) of the item 30, or a relative height with respect to a certain reference plane. Floor 375 indicates the floor 10 on which the item 30 is estimated to be present (hereinafter, also referred to as "location floor") for each estimation result record, by a value of Floor ID 331 or Floor Number 332 in the floor table 330. In the present embodiment, one or both of the value of Height 374 and the value of Floor 375 may be expressed using the term "position in a height direction".

<1-3-3. Accumulating Reading Results>

The tag processing unit 231 of the management unit 230 processes reading result data received from the tag reader 100 via the communication unit 210. For example, when the reading result data is received, the tag processing unit 231 determines whether the tag ID indicated by the reading result data is an ID of an item tag 50 or an ID of a position tag 40 by referring to the item table 310 and the position tag table 320. The tag processing unit 231 then assigns a record number to the record of the reading result data indicating a tag ID of an item tag 50, and adds the record to the item reading table 350 as an item reading record. The tag processing unit 231 also assigns a record number to the record of the reading result data indicating a tag ID of a position tag 40, and adds the record to the position reading table 360 as a position reading record. In this manner, reading results of tag IDs by at least one tag reader 100 are accumulated over time in the item reading table 350 and the position reading table 360 of the item DB 220. Each of the accumulated item reading records and position reading records indicates the air pressure value gauged when the tag was read, in addition to the read tag ID and the reading time.

<1-3-4. Estimating Height>

The estimation unit 232 of the management unit 230 estimates the position in the height direction of each of the items 30 under management of the system, based on the reading results accumulated in the item reading table 350 and the position reading table 360. More specifically, the estimation unit 232 estimates a position in the height direction of an item 30 based on a first air pressure value at the time of reading a tag ID from a position tag 40 by at least one tag reader 100 and a second air pressure value at the time of reading the tag ID from the item tag 50 attached to the item 30.

In a simple example, for a single item reading record about a target item whose height is to be estimated, only one position reading record may be required. The reading results indicated by such records may be received from the same tag reader 100, or may be received from different tag readers 100. However, in this simple example, the position reading record referred to for estimating the height of the target item shall be a record having a reading time close to the reading time of the item tag 50 of the target item to such an extent that changes in the atmospheric pressure caused by fluctuations in environmental factors such as the weather are negligible.

(1) Estimating Height Using Air Pressure-Height Model

In a practical example, the air pressure value indicated by a position reading record selected as appropriate is represented by $P_1$, and the air pressure value indicated by the item reading record for a target item is represented by $P_2$. A height $H_2$ of the target item is expressed by the following relational expression, using the air pressure values $P_1$ and $P_2$ and a known installation height $H_1$ of the corresponding position tag 40:

[Math. 1]

$$H_2 = \alpha \cdot (P_1 - P_2) + H_1 \tag{1}$$

In the present specification, the relational expression between the air pressure and height, as indicated by Formula (1), is referred to as an "air pressure-height model". The coefficient α represents the slope of the air pressure-height model approximated by a linear expression. In a practical example, the value of the coefficient α may be a predefined fixed value. In this case, the estimation unit 232 can estimate the height $H_2$ of the target item by applying the coefficient α, which is a fixed value, the air pressure values $P_1$ and $P_2$, and the installation height $H_1$ of the position tag 40 to Formula (1). That is, the air pressure-height model in this practical example is a static model. Although the estimation accuracy of such a static model may drop due to the effects of errors caused by fluctuations in environmental factors, the model is easy to implement, and is advantageous in that the height of the target item can be estimated immediately with a low computational load.

In another practical example, the air pressure-height model is derived dynamically using position reading records for at least two position tags 40 installed at different heights. The reading times of the position reading records referred to shall appropriately correspond to the reading time of the item tag 50 of the target item (for example, a time difference from the reading time of the item tag 50 of the target item is less than a threshold). The estimation unit 232 may derive the coefficient α of the air pressure-height model of Formula (1) based on, for example, the respective air pressure values indicated by the two position reading records and the known heights of the two position tags 40. Specifically, when the air pressure values indicated by the two position reading records are represented by $P_{R1}$ and $P_{R2}$, respectively, and the known heights of the corresponding position tags are represented by $H_{R1}$ and $H_{R2}$, the coefficient α can be calculated through the following formula:

[Math. 2]

$$\alpha = (H_{R2} - H_{R1})/(P_{R1} - P_{R2}) \tag{2}$$

In this case, the estimation unit 232 can estimate the height $H_2$ of the target item by applying the calculated coefficient α, the air pressure value $P_1$ indicated by one of the position reading records referred to, the air pressure value $P_2$, and the installation height $H_1$ of the corresponding position tag 40 to Formula (1). Dynamically deriving the air pressure-height model in this manner makes it possible to estimate the height of the target item while suppressing errors caused by fluctuations in environmental factors and avoiding a drop in the estimation accuracy.

When a plurality of users 20 continue to be active in the item management system 1, a large number of data of air pressure values gauged as the position tags 40 are read concurrently on many of the floors 10 is accumulated in the position reading table 360. Accordingly, in yet another practical example, the estimation unit 232 may derive a refined air pressure-height model by performing a regression analysis using such a large-scale set of data.

For example, assume that the air pressure value is gauged as a position tag 40 is read N times during a given period, with the air pressure value indicated by an n-th position reading record being represented by $P_{Rn}$ and the known height of the corresponding position tag 40 being represented by $H_{Rn}$ (where n=1, . . . , N). Here, the period may be, for example, a period having a predetermined length of time centered on (or at an end point of) the reading time of the item tag 50 of the target item. A sum of squares E of the errors of the height of each position tag 40 estimated from N position reading records according to a model such as that indicated by Formula (1), with respect to the actual height, can be expressed by the following formula:

[Math. 3]

$$E = \sum_{n=1}^{N} (H_{Rn} - \alpha \cdot P_{Rn} - \beta)^2 \tag{3}$$

For the reading time of an item tag 50, the estimation unit 232 can calculate the values of unknown parameters α and β, which minimize such error E, according to the least-squares method. Then, the estimation unit 232 can estimate a height $H_2$ of a target item by applying the air pressure value $P_2$ gauged when reading the tag ID from the item tag 50 to an air pressure-height model such as that indicated by the following formula, constructed using the calculated parameters α and β.

[Math. 4]

$$H_2 = -\alpha \cdot P_2 + \beta \tag{4}$$

As an alteration example of the method using the regression analysis described above, the estimation unit 232 may include weights that depend on time differences between the reading times when calculating the sum of squares E of the error. For example, the reading time of the item tag 50 of the target item is represented by T, the reading time of the n-th position reading record is represented by $T_n$, a time difference τ is represented by $T-T_n$, and a weighting function W(τ) is defined as indicated by Formula (5). Using this weighting function, Formula (3) can be transformed as indicated by Formula (6):

[Math. 5]

$$W(\tau) = a \cdot e^{-b\tau^2} \tag{5}$$

$$E' = \sum_{n=1}^{N} (H_{Rn} - \alpha \cdot P_{Rn} - \beta)^2 \cdot W(T - T_n) \tag{6}$$

Parameters a and b in Formula (5) may be fixed values determined by prior tuning. According to Formula (5), the value of the weight changes like a normal distribution centered on the time difference τ=0, that is, takes on a higher value the closer the time difference τ is to zero. Again, in this case, the estimation unit 232 can calculate the values of the parameters α and β, which minimize the error E', according to the least-squares method. Then, the estimation unit 232 can estimate the height $H_2$ of the target item by applying the air pressure value $P_2$ gauged when reading the tag ID from the item tag 50 to an air pressure-height model such as that indicated by Formula (4), constructed using the calculated parameters α and β. According to such an alteration example, when deriving the air pressure-height model, the contribution of a position reading record having a large time difference τ is relatively reduced, making it possible to derive a more refined air pressure-height model and estimate the height with high accuracy. This also makes it possible to set a longer extraction period for the position reading records, such that more samples can be used in the regression analysis.

Note that the air pressure-height models described using Formulas (1) to (6) are merely several examples. The air pressure-height model may be represented by a higher-order polynomial expression, or a non-linear relational expression which is not a polynomial expression, instead of a linear expression. The estimation unit 232 may also switch between a static air pressure-height model and a dynamically-derived air pressure-height model in accordance with the number of position reading records in the position reading table 360 that can be used. For example, when there are few position reading records that can be used, using a static air pressure-height model makes it possible to prevent the result of the height estimation from becoming unstable.

(2) Floor Estimation

After estimating the height of the target item, the estimation unit 232 may further estimate a located floor of the target item (that is, on which floor 10 the target item is present) based on the estimated height. The estimation unit 232 may estimate the floor on which the target item is located by, for example, comparing the height of the floor surface of each floor 10 indicated in the floor table 330 with the estimated height of the target item. For example, in the example in FIG. 4C, if an estimated height h of the target item satisfies h1≤h<h2, the estimation unit 232 can estimate that the target item is present on the first floor. Similarly, if h satisfies h2≤h<h3, the estimation unit 232 can estimate that the target item is present on the second floor. Note that if the difference in height between the floors 10 (that is, the floor spacing) is constant, the estimation unit 232 may estimate the floor on which the target item is located by dividing the relative height of the target item from the ground floor by the floor spacing. In this case, the floor table 330 need not include Height 333 as a data element.

In the present embodiment, upon estimating the height and the located floor of the target item, the estimation unit 232 adds an estimation result record indicating the item ID, the detection time (the reading time of the item tag), the estimated height, and the located floor of the target item to the estimation result table 370. Such estimation by the estimation unit 232 may be made at one or more of the following timings, for example:

- when the item 30 is detected by a tag reader 100
- when an inquiry regarding the position of the item 30 is received from a user 20
- when a regular timing arrives (for example, once every half day or day)
- when the position tag 40 is detected by a tag reader 100

If, after the height of the target item and the floor on which the target item is located have been estimated once, an air pressure-height model is derived dynamically after a new position tag 40 is detected and the height is estimated again, the estimated value of the height may change (and the floor on which the target item is located may also change accordingly). If the estimation result has changed in such a manner, the estimation unit 232 may update the existing estimation result record in the estimation result table 370.

Note that the estimation unit 232 may estimate only the height of the target item or the floor on which the target item is located, and cause the result to be stored in the estimation result table 370. If both the height of the target item and the floor on which the target item is located are estimated, the height stored in the estimation result table 370 may be a relative height from the floor surface of the floor on which the target item is located. For example, in a space where a user can use lifting equipment such as a ladder or an elevating work vehicle, such as a warehouse with a high ceiling or a building under construction, it is beneficial to be able to get to know the heights of items on the same floor.

The methods for estimating the height and the floor are not limited to the examples described above. For example, an air pressure-floor model may be configured instead of an air pressure-height model by replacing the height parameter H in Formulas (1) to (6) with a floor parameter F representing the floor number. In this case, the estimation unit 232 can directly estimate the corresponding floor number without using the height value by applying the air pressure value to the air pressure-floor model.

<1-3-5. Providing Height Information>

The information provision unit 233 of the management unit 230 provides the information maintained in the item DB 220 to the user 20. More specifically, the information provision unit 233 may provide information regarding positions in the height direction of items 30, estimated by the estimation unit 232 (hereinafter, simply referred to as "height information"), to the user 20 on the display of the terminal apparatus 80. For example, the information provision unit 233 may, in response to an inquiry for height information for a given target item, obtain the latest estimation result for the height of the target item and the floor on which the target item is located from the estimation result table 370, and provide that result to the user 20. Alternatively, the information provision unit 233 may, in response to an inquiry as to which items 30 are present on a given target floor, specify one or more items 30 in the estimation result table 370 of which latest located floors are that target floor, and provide a list of the specified items 30 to the user 20. Alternatively, the information provision unit 233 may extract one or more records that match conditions specified by the user 20 from the estimation result records maintained in the estimation result table 370, and provide those estimation result records to the user 20 in table format.

Note that the information provision unit 233 may provide height information to the user 20 via an audio interface (for example, a speaker and a microphone) rather than on the display of the terminal apparatus 80. Alternatively, the information provision unit 233 may provide height information on items 30 (for example, in data file format) to another system working in cooperation with the item management system 1 or other applications.

<1-3-6. Examples of Height Estimation Scenarios>

Two different height estimation scenarios will be described next with reference to FIGS. 6 to 9.

(1) First Scenario

Figure 6:
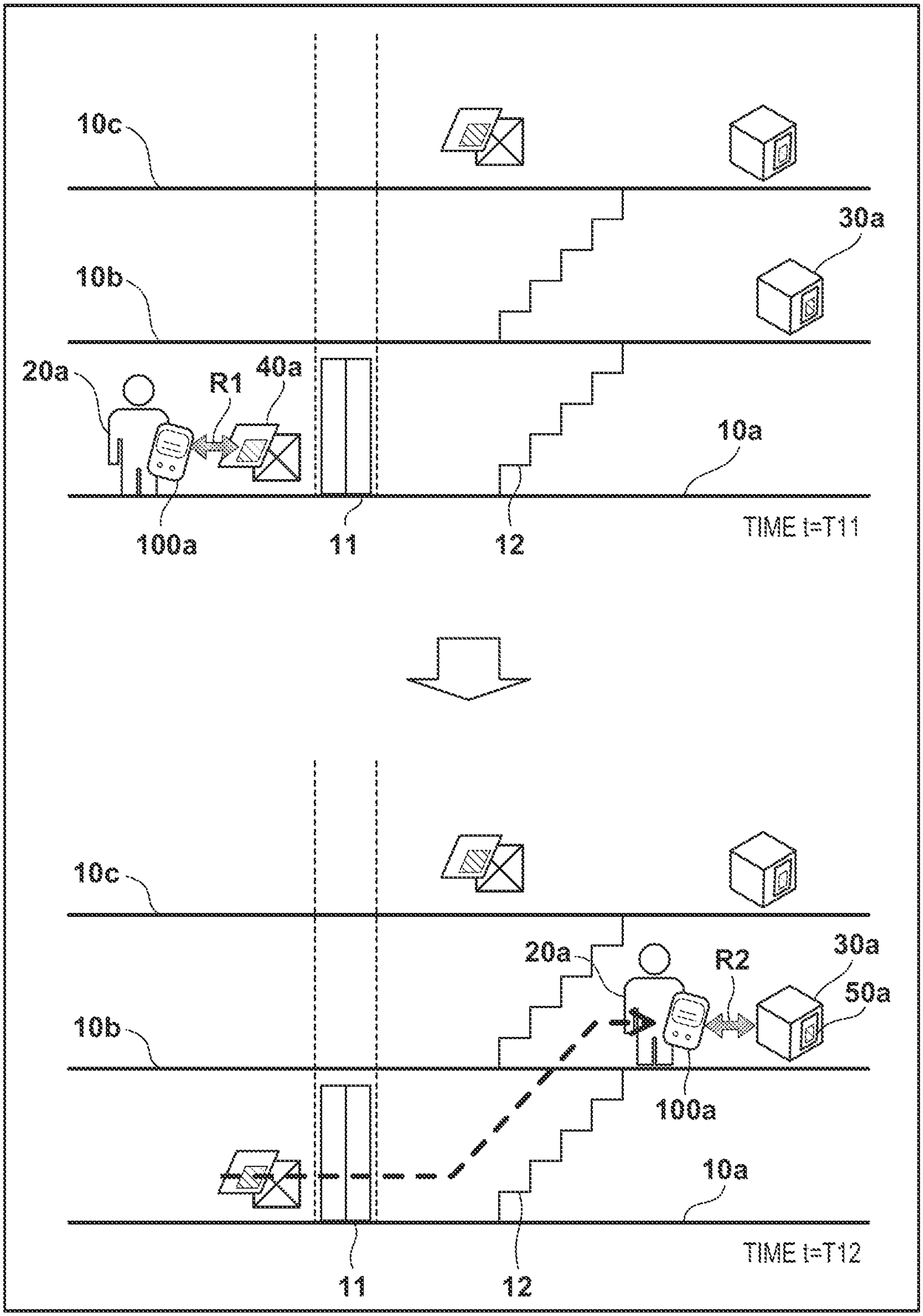
FIG. 6 is an explanatory diagram illustrating how tags are read along a certain scenario.

FIG. 6 illustrates the tag reader 100*a* carried by the user 20*a* reading tags within a building including floors 10*a*, 10*b*, and 10*c*, according to a given example scenario. In the upper part of FIG. 6, when the user 20*a* approaches the position tag 40*a*, which is installed on the floor 10*a* corresponding to the first floor, the tag reader 100*a* reads the tag ID from the position tag 40*a*, as indicated by arrow R1 in the figure. The reading time is T11. At this time, the tag reader 100*a* gauges the air pressure, and transmits reading result data, including the tag ID of the position tag 40*a* and the gauged air pressure value, to the management server 200.

The user 20*a* then climbs the staircase 12 to the floor 10*b* corresponding to the second floor. In the lower part of FIG. 6, when the user 20*a* approaches the item 30*a*, the tag reader 100*a* reads the tag ID from the item tag 50*a* attached to the item 30*a*, as indicated by arrow R2 in the figure. The reading time is T12. At this time, the tag reader 100*a* again gauges the air pressure, and transmits reading result data, including the tag ID of the item tag 50*a* and the gauged air pressure value, to the management server 200.

Figure 7:
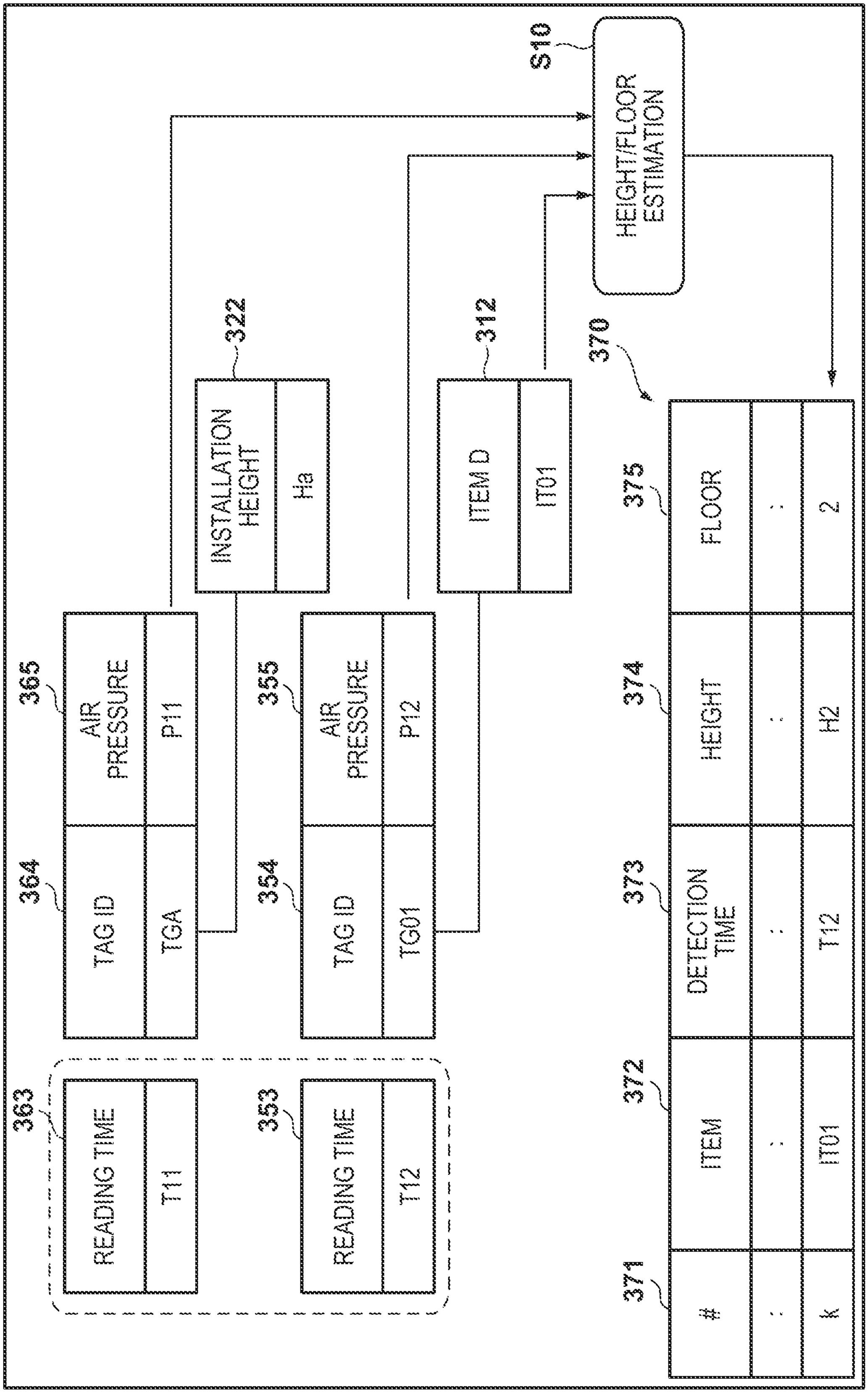
FIG. 7 is an explanatory diagram for explaining height estimation using a static air pressure-height model.

FIG. 7 illustrates part of the record added to the position reading table 360 as a result of the tag being read from the position tag 40*a* at the reading time T11, and here, Reading Time 363 indicates "T11", Tag ID 364 indicates "TGA", and Air Pressure 365 indicates "P11". The tag ID "TGA" is an identifier of the position tag 40*a*, and an installation height "Ha" is associated therewith in the position tag table 320. FIG. 7 also illustrates part of the record added to the item reading table 350 as a result of the tag being read from the item tag 50*a* at the reading time T12, and here, Reading Time 353 indicates "T12", Tag ID 354 indicates "TG01", and Air Pressure 355 indicates "P12". The tag ID "TG01" is an identifier of the item tag 50*a* attached to the item 30*a*, and an item ID "IT01" is associated therewith in the item table 310. The position reading record and the item reading record correspond with each other in that the reading times are sufficiently close to each other.

The estimation unit 232 can estimate the height of the item 30*a* by applying "P11" as the first air pressure value $P_1$, "Ha" as the installation height $H_1$, and "P12" as the second air pressure value $P_2$, indicated by these two records, to the static air pressure-height model represented by Formula (1) (S10). The lower part of FIG. 7 illustrates an example of the estimation result record that is a result of such estimation. Here, a k-th record in the estimation result table 370 indicates the detection time "T12", the estimated height "H2", and the estimated floor number "2" of the floor on which the item is located, along with the item ID "IT01" of the item 30*a*.

(2) Second Scenario

Figure 8A:
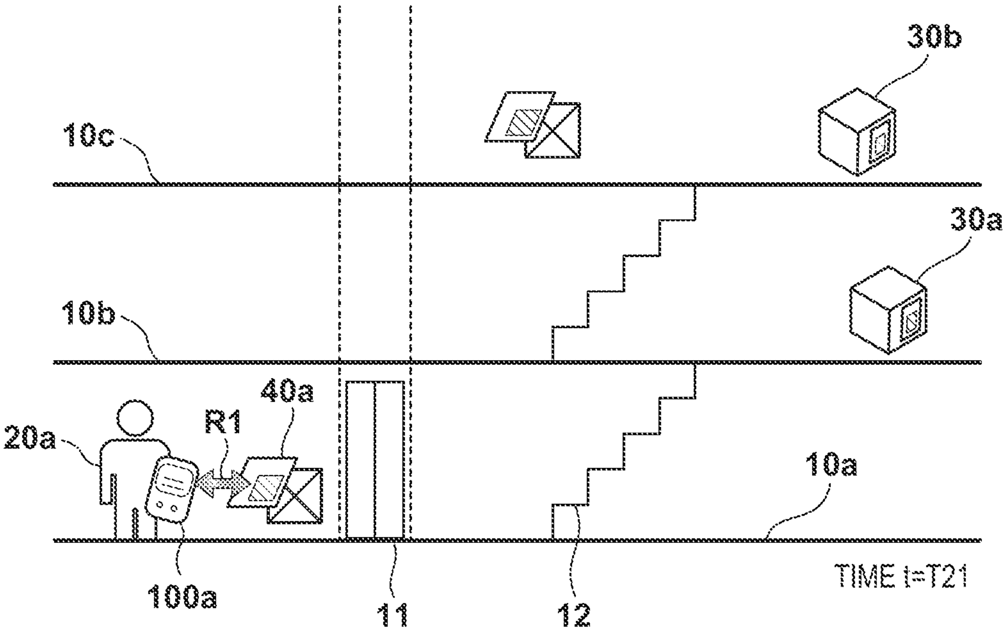
FIG. 8A is a first explanatory diagram illustrating how tags are read along another scenario.
Figure 8B:
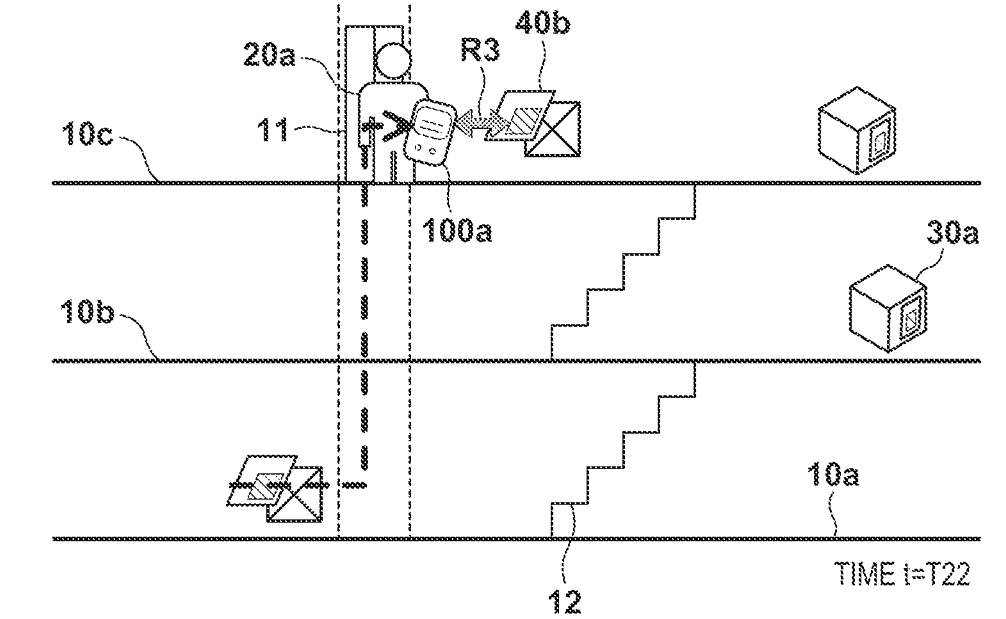
FIG. 8B is a second explanatory diagram illustrating how tags are read along another scenario.
Figure 8C:
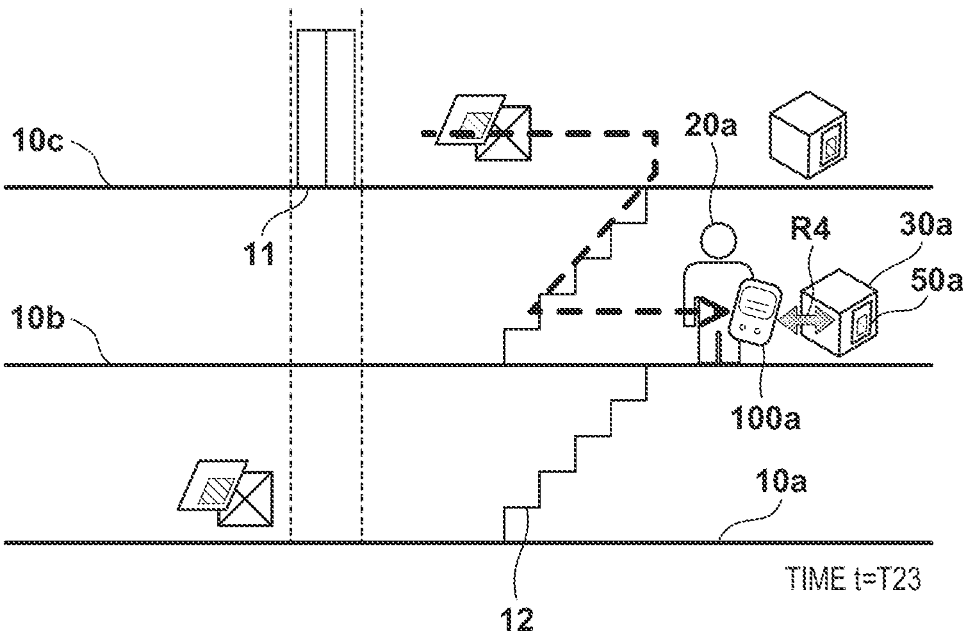
FIG. 8C is a third explanatory diagram illustrating how tags are read along another scenario.

FIGS. 8A to 8C illustrate the tag reader 100*a* carried by the user 20*a* reading tags within a building including floors 10*a*, 10*b*, and 10*c*, in the same manner as in the scenario in FIG. 6, according to another example scenario. In FIG. 8A, when the user 20*a* approaches the position tag 40*a*, which is installed on the floor 10*a* corresponding to the first floor, the tag reader 100*a* reads the tag ID from the position tag 40*a*, as indicated by arrow R1 in the figure. The reading time is T21. At this time, the tag reader 100*a* gauges the air pressure, and transmits reading result data, including the tag ID of the position tag 40*a* and the gauged air pressure value, to the management server 200.

The user 20*a* then uses the elevator 11 to ascend to the floor 10*c* corresponding to the third floor. In FIG. 8B, when the user 20*a* approaches the position tag 40*b*, which is installed on the floor 10*c*, the tag reader 100*a* reads the tag ID from the position tag 40*b*, as indicated by arrow R3 in the figure. The reading time is T22. At this time, the tag reader 100*a* again gauges the air pressure, and transmits reading result data, including the tag ID of the position tag 40*b* and the gauged air pressure value, to the management server 200.

The user 20*a* then descends the staircase 12 to the floor 10*b* corresponding to the second floor. In FIG. 8C, when the user 20*a* approaches the item 30*a*, the tag reader 100*a* reads the tag ID from the item tag 50*a* attached to the item 30*a*, as indicated by arrow R4 in the figure. The reading time is T23. At this time, the tag reader 100*a* again gauges the air pressure, and transmits reading result data, including the tag ID of the item tag 50*a* and the gauged air pressure value, to the management server 200.

Figure 9:
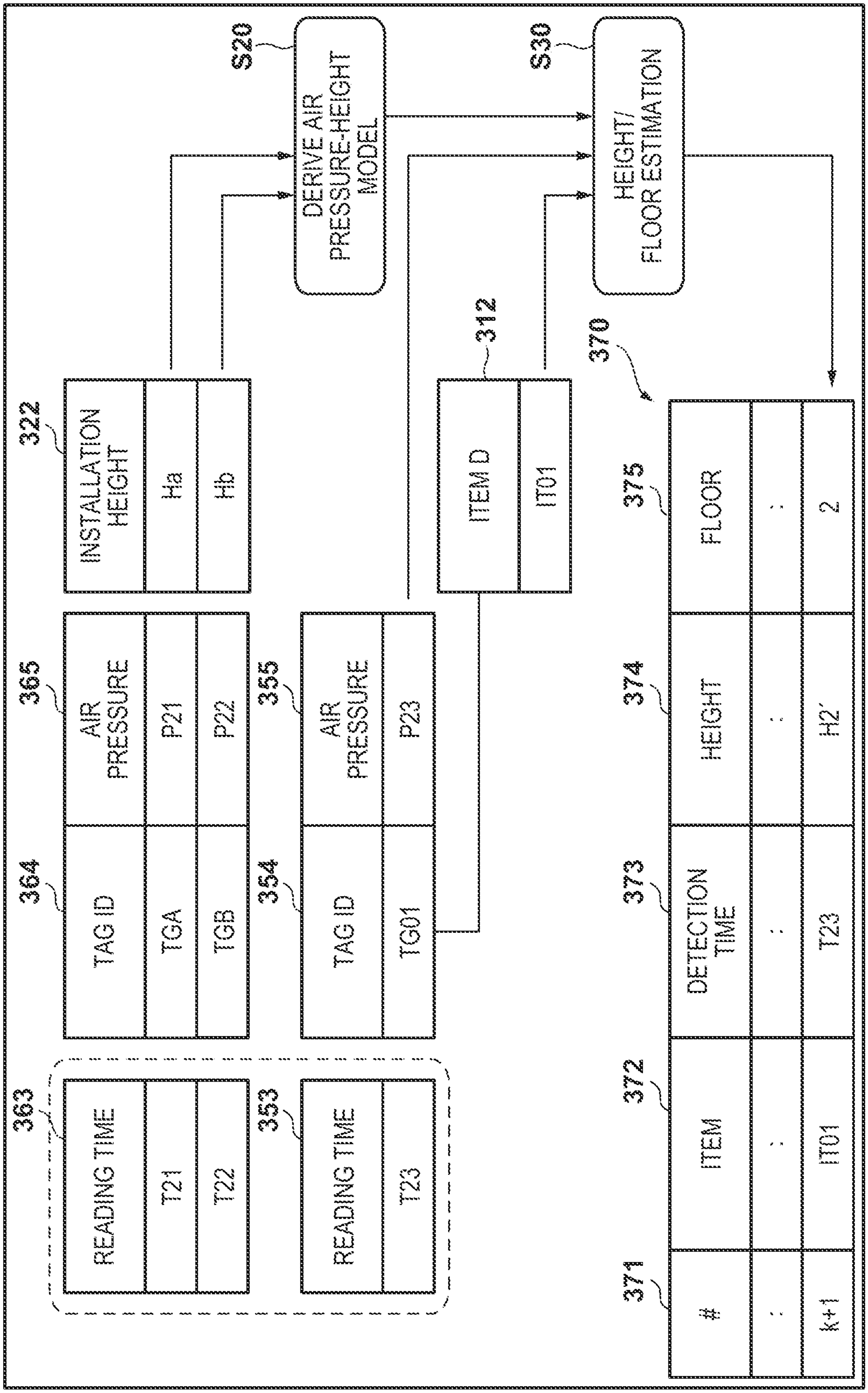
FIG. 9 is an explanatory diagram for explaining height estimation using a dynamic air pressure-height model.

FIG. 9 illustrates parts of two records added to the position reading table 360 as a result of the tags being read from the position tags 40*a* and 40*b* at the reading times T21 and T22. The air pressure value is "P21" when the tag ID "TGA" is read at the reading time "T21", and the tag ID "TGA" is associated with the installation height "Ha". The air pressure value is "P22" when the tag ID "TGB" is read at the reading time "T22", and the tag ID "TGB" is associated with the installation height "Hb". These two position reading records correspond to the item reading record for the item 30*a* that is the target item, in terms of having reading times that are close to the reading time of that item reading record.

The estimation unit 232 calculates the coefficient α of the air pressure-height model by applying the air pressure values "P11" and "P22" indicated by the two position reading records, and the corresponding installation heights "Ha" and "Hb", to Formula (2). Then, the estimation unit 232 can dynamically derive an air pressure-height model equivalent to Formula (1) using the calculated coefficient α, the air pressure value indicated by one of the two position reading records, and the corresponding installation height (S20).

FIG. 9 also illustrates part of the item reading record added to the item reading table 350 as a result of the tag being read from the item tag 50*a* at the reading time T23. According to this item reading record, the air pressure value is "P23" when the tag ID "TG01" is read at the reading time "T23". The estimation unit 232 can estimate the height of the item 30*a* by applying the air pressure value "P23" indicated by this item reading record to the air pressure-height model derived in the processing of S20 (S30). The lower part of FIG. 9 illustrates an example of the estimation result record that is a result of such estimation. Here, a k+1-th record in the estimation result table 370 indicates the detection time "T23", the estimated height "H2'", and the estimated floor number "2" of the floor on which the item is located, along with the item ID "IT01" of the item 30*a*. Compared to the scenarios in FIGS. 6 and 7, in this scenario, the height of the target item is estimated using the air pressure-height model dynamically derived based on the air pressure values when the tags are read from the two position tags 40, and thus errors caused by fluctuations in environmental factors are suppressed, and the estimation accuracy is improved.

The scenarios in FIGS. 8A and 9 illustrate an example of calculating the coefficient α for converting an air pressure difference to a height difference based on the two position reading records. However, if more position reading records can be used, the air pressure-height model may be derived dynamically through a more advanced analysis, such as regression analysis using the least-squares method, in the processing of S20 in FIG. 9. At that time, a record indicating a reading time having a lower time difference from the reading time of the item tag may be taken into account preferentially. The estimation unit 232 may also switch whether to derive a dynamic air pressure-height model, or whether to perform a regression analysis, depending on the number of available position reading records. Additionally, although only one tag reader 100*a* appears in the two scenarios described above, the results of tags being read by a plurality of different tag readers 100 may be used for deriving the air pressure-height model or estimating the height.

As illustrated in the examples in FIGS. 6 and 8A to 8C, installing a position tag 40 at a location where users frequently pass nearby, such as near an elevator door or an entrance to the ground floor, can increase the likelihood that a tag reader 100 carried by a user will detect the position tag 40. By doing so, more position reading records are accumulated in the database as a result of the users' activity, and thus the accuracy of the dynamically-derived air pressure-height model can be improved further.

<1-4. Flow of Processing>

(1) Height Estimation Processing—First Example

Figure 10:
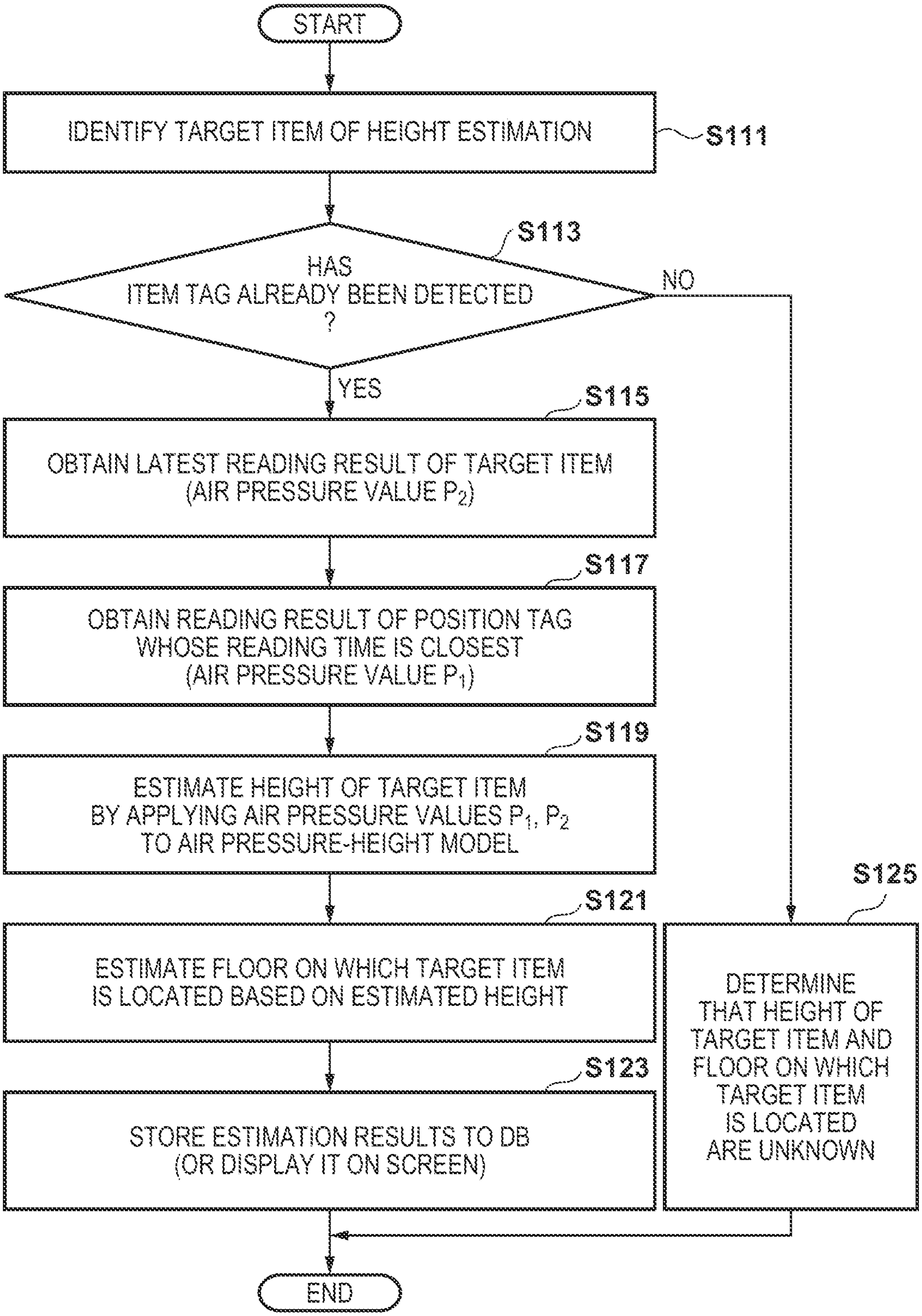
FIG. 10 is a flowchart illustrating a first example of a flow of height estimation processing according to the first embodiment.

FIG. 10 is a flowchart illustrating a first example of the flow of height estimation processing that can be executed by the management server 200 according to the first embodiment. In the first example, a height of a target item is assumed to be estimated based on the static air pressure-height model described with reference to FIGS. 6 and 7. Note that in the following descriptions, processing steps are indicated by 'S', indicating "step".

First, in S111, the estimation unit 232 identifies a target item for which the height is to be estimated. For example, the estimation unit 232 can identify an item 30 specified through an inquiry from the terminal apparatus 80, an item 30 newly detected by a tag reader 100, or each item 30 for which information is updated periodically, as the target item for which the height is to be estimated.

Next, in S113, the estimation unit 232 determines whether the identified target item has already been detected by the tag reader 100. For example, the estimation unit 232 can determine that the target item has already been detected if an item reading record for the item tag 50 attached to the target item is present in the item reading table 350. If the target item has already been detected, the sequence moves to S115. If the target item has not already been detected, the sequence moves to S125.

In S115, the estimation unit 232 obtains the latest reading result for the target item, that is, the item reading record having the newest reading time, from the item reading table 350. The air pressure value indicated by the item reading record obtained here is assumed to be $P_2$.

Next, in S117, the estimation unit 232 obtains, from the position reading table 360, a reading result for a position tag 40, that is, a position reading record, having the closest reading time to the reading time of the item reading record obtained in S115. The air pressure value indicated by the position reading record obtained here is assumed to be $P_1$.

Next, in S119, the estimation unit 232 applies the air pressure values $P_1$ and $P_2$ and the corresponding installation height of the position tag 40 to the static air pressure-height model, and estimates the height of the target item. Furthermore, in S121, the estimation unit 232 estimates the floor on which the target item is located based on the height of the target item estimated in S119.

Next, in S123, the estimation unit 232 stores the result of the height estimation in S119 and S121 in the item DB 220. Specifically, the estimation unit 232 may add an estimation result record indicating the estimated height and the located floor of the target item to the estimation result table 370. Note that if the height estimation processing has been started in response to receiving a height information inquiry from the terminal apparatus 80, the information provision unit 233 may transmit the result of the height estimation to the terminal apparatus 80 and display the height information in the display.

On the other hand, if the target item has not already been detected, in S125, the estimation unit 232 determines that the height and the located floor of the target item are unknown. If the height estimation processing has been started in response to receiving an inquiry for height information from the terminal apparatus 80, the information provision unit 233 may transmit a response to the terminal apparatus 80 indicating that the height and the located floor of the target item are unknown. The height estimation processing illustrated in FIG. 10 then ends.

(2) Height Estimation Processing—Second Example

Figure 11:
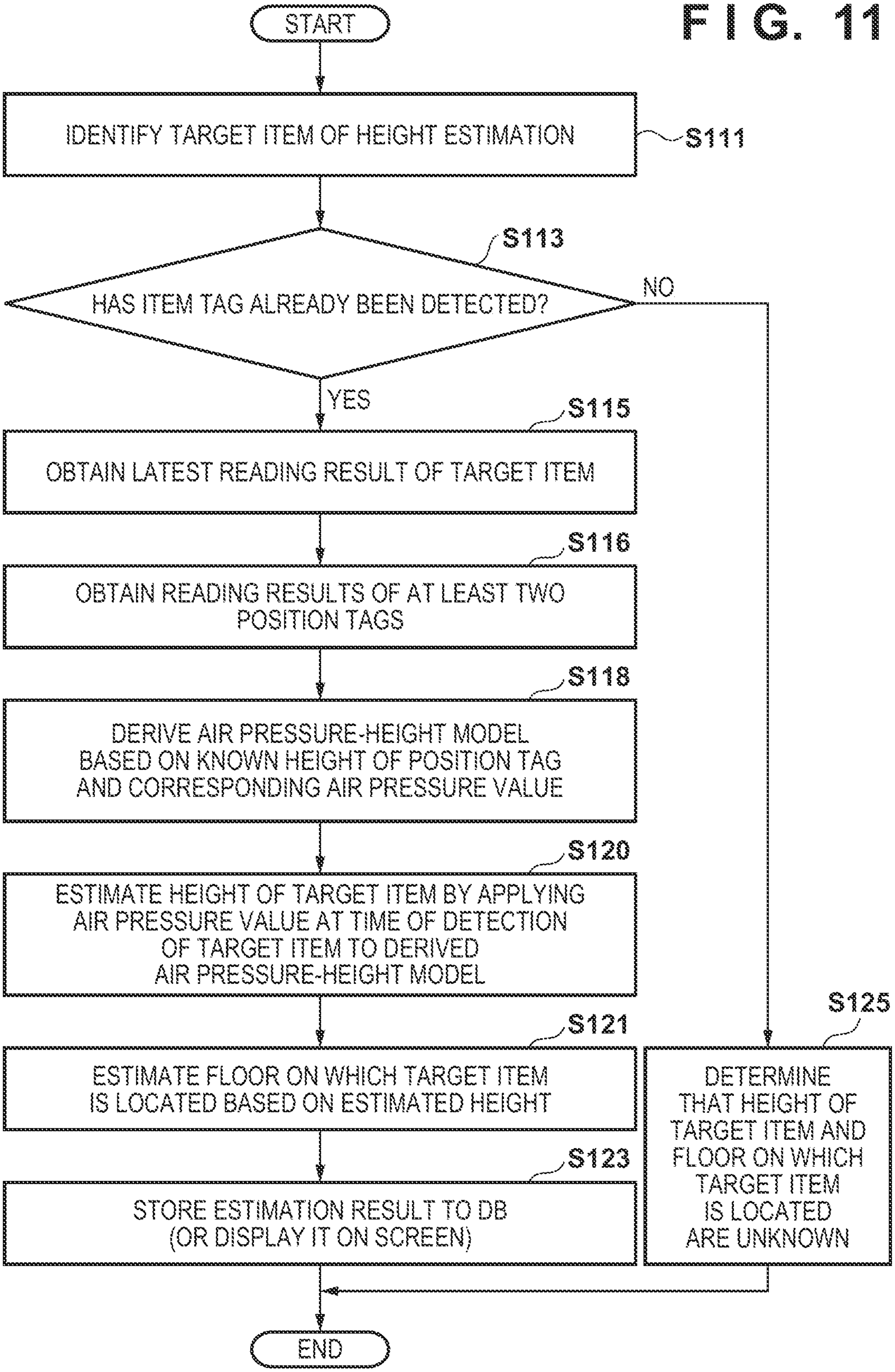
FIG. 11 is a flowchart illustrating a second example of a flow of height estimation processing according to the first embodiment.

FIG. 11 is a flowchart illustrating a second example of the flow of height estimation processing that can be executed by the management server 200 according to the first embodiment. In the second example, a height of a target item is assumed to be estimated based on a dynamically-derived air pressure-height model.

First, in S111, the estimation unit 232 identifies a target item for which the height is to be estimated. Next, in S113, the estimation unit 232 determines whether the identified target item has already been detected by a tag reader 100. If the target item has already been detected, the sequence moves to S115. If the target item has not already been detected, the sequence moves to S125.

In S115, the estimation unit 232 obtains the latest reading result for the target item, that is, the item reading record having the newest reading time, from the item reading table 350. Next, in S116, the estimation unit 232 obtains, from the position reading table 360, position reading records for at least two position tags 40 having a reading time close to the reading time of the item reading record obtained in S115.

Next, in S118, the estimation unit 232 derives an air pressure-height model to be used for estimating the height of the target item based on the air pressure values indicated by the at least two position reading records obtained in S116 and the known heights of the corresponding position tags 40.

Next, in S120, the estimation unit 232 applies the air pressure value gauged when the target item was detected (the air pressure value indicated by the item reading record obtained in S115) to the air pressure-height model derived in S118, and estimates the height of the target item. Furthermore, in S121, the estimation unit 232 estimates the floor on which the target item is located based on the height of the target item estimated in S120.

The processing in S123 and S125 may be the same as the processing described with reference to FIG. 10, and will therefore not be described here.

<1-5. Summary of First Embodiment>

According to the first embodiment described in this section, in an item management system, at least one first wireless device (a position tag) storing first identification information (a tag ID) is installed at a known location in a real space. Additionally, a second wireless device (an item tag) storing second identification information (a tag ID) is attached to an item for which a height is to be estimated. At least one reading apparatus (a tag reader) which can move together with a mobile object outputs a first air pressure value by gauging an air pressure when reading the tag ID from the at least one position tag, and outputs a second air pressure value by gauging the air pressure when reading the tag ID from the item tag. Then, the position in the height direction of the target item is estimated based on the first air pressure value and the second air pressure value output by the at least one tag reader. According to this configuration, the position in the height direction of the target item can be estimated without the need to install a tag reader, which is relatively expensive, on all the floors of a building. The position in the height direction of the item can therefore be ascertained efficiently while suppressing costs for introducing a system to estimate heights. Furthermore, tags can be read and air pressures can be gauged by the tag reader which moves together with the user (or another mobile object) as he or she engages in normal activities in the real space. Accordingly, the positions in the height direction of items present in various locations in the real space can be estimated, and height information can be provided, without the user being aware of the operation of the tag readers.

Additionally, according to the first embodiment, a reading result received from each tag reader, including the tag ID read, the reading time, and the air pressure value gauged at the time of reading, is accumulated in a database. Then, a reading result for a position tag indicating a reading time corresponding to the reading time of a tag ID from an item tag of a target item is obtained from the database, and the position in the height direction of the target item is estimated based on a first air pressure value indicated by the obtained reading result, and the above-mentioned second air pressure value. According to this configuration, when height information of a target item is requested, a result of reading a tag from at least one position tag that is optimal for height estimation can be extracted, and highly-accurate height estimation can be performed. For example, when a position tag has been detected after the detection of the item tag of the target item, or when a different position tag has been detected at a timing that is close, in terms of time, by a tag reader carried by a different user, the result of the detection can be used for the height estimation.

Additionally, according to the first embodiment, at least two position tags are installed at different heights (for example, different floors). Then, a relational expression between the air pressure and the height can be derived based on the respective first air pressure values gauged when the tag IDs are read from the at least two position tags and the known heights of the at least two position tags. Estimating the position in the height direction of the target item using a relational expression derived dynamically in this manner makes it possible to improve the accuracy of the height estimation compared to a case where a relational expression defined statically in advance is used. When deriving the relational expression dynamically, time differences of the reading times of the tag IDs from respective position tags with respect to the reading time of the tag ID from the item tag of the target item may also be taken into account (for example, weights according to the time differences are assigned to respective reading results, a reading result having a large time difference is ignored, or the like). This makes it possible to refine the derived relational expression while suppressing the influence of errors caused by temporal fluctuations in environmental factors such as the weather.

2. Second Embodiment

<2-1. System Overview>

Figure 12:
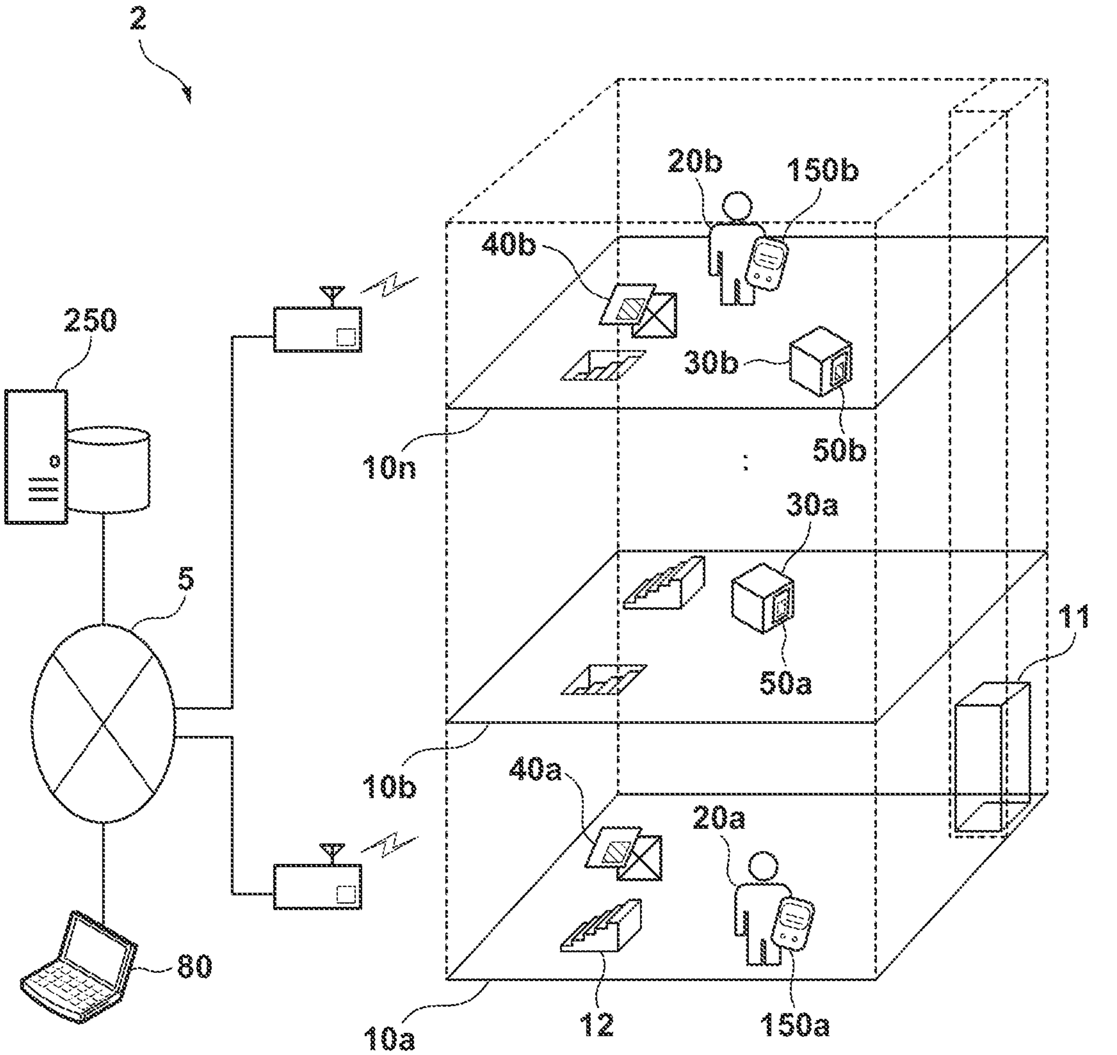
FIG. 12 is a schematic view illustrating an example of a configuration of an item management system according to a second embodiment.

FIG. 12 is a schematic view illustrating an example of a configuration of an item management system 2 according to a second embodiment. Like the item management system 1, the item management system 2 is a system for managing a location of each of one or more items.

The item management system 2 also makes use of two types of wireless devices, namely, the position tags 40 and the item tags 50, for the purpose of item management. In the example in FIG. 12 too, the position tag 40*a* is installed on the floor 10*a* and the position tag 40*b* is installed on the floor 10*n*, but the installation positions of these position tags 40 may of course be different from those in the first embodiment. There exists the item 30*a* on the floor 10*b*, and the item tag 50*a* is attached to the item 30*a*. There exists the item 30*b* on the floor 10*n*, and the item tag 50*b* is attached to the item 30*b*. In the present embodiment too, each of the item tags 50 moves as the corresponding item moves.

The user 20*a* carries a tag reader 150*a*. The user 20*b* carries a tag reader 150*b*. The item management system 2 includes at least one such tag reader 150, a management server 250, and the terminal apparatus 80. The tag readers 150, the management server 250, and the terminal apparatus 80 are connected to the network 5.

Like the tag reader 100 according to the first embodiment, the tag reader 150 is a reading apparatus that is capable of reading, from wireless devices such as RFID tags, information stored in the wireless devices. However, in the present embodiment, the tag reader 150 is assumed to be capable of measuring a relative amount of movement from a reference position using a self-localization technique (also referred to as Pedestrian Dead Reckoning (PDR)), which will be described in further detail below. The tag reader 150 reads tags and gauges air pressure periodically or in response to some kind of trigger, for example, and provides a tag reading result, including the gauged air pressure value, to the management server 250. The tag reading result provided to the management server 250 further includes a measured amount of movement of the tag reader 150. The tag reader 150 may be capable of communicating with the management server 250 directly or indirectly via a certain relay apparatus.

Like the management server 200 according to the first embodiment, the management server 250 is an information processing apparatus that manages information regarding locations of a plurality of items 30 in a database. The management server 250 may be implemented as an application server, a database server, or a cloud server, using a high-end general-purpose computer, for example. The management server 250 receives tag reading results from the tag reader 150, and updates the database based on the received tag reading results.

<2-2. Configuration Example of Tag Reader>

Figure 13:
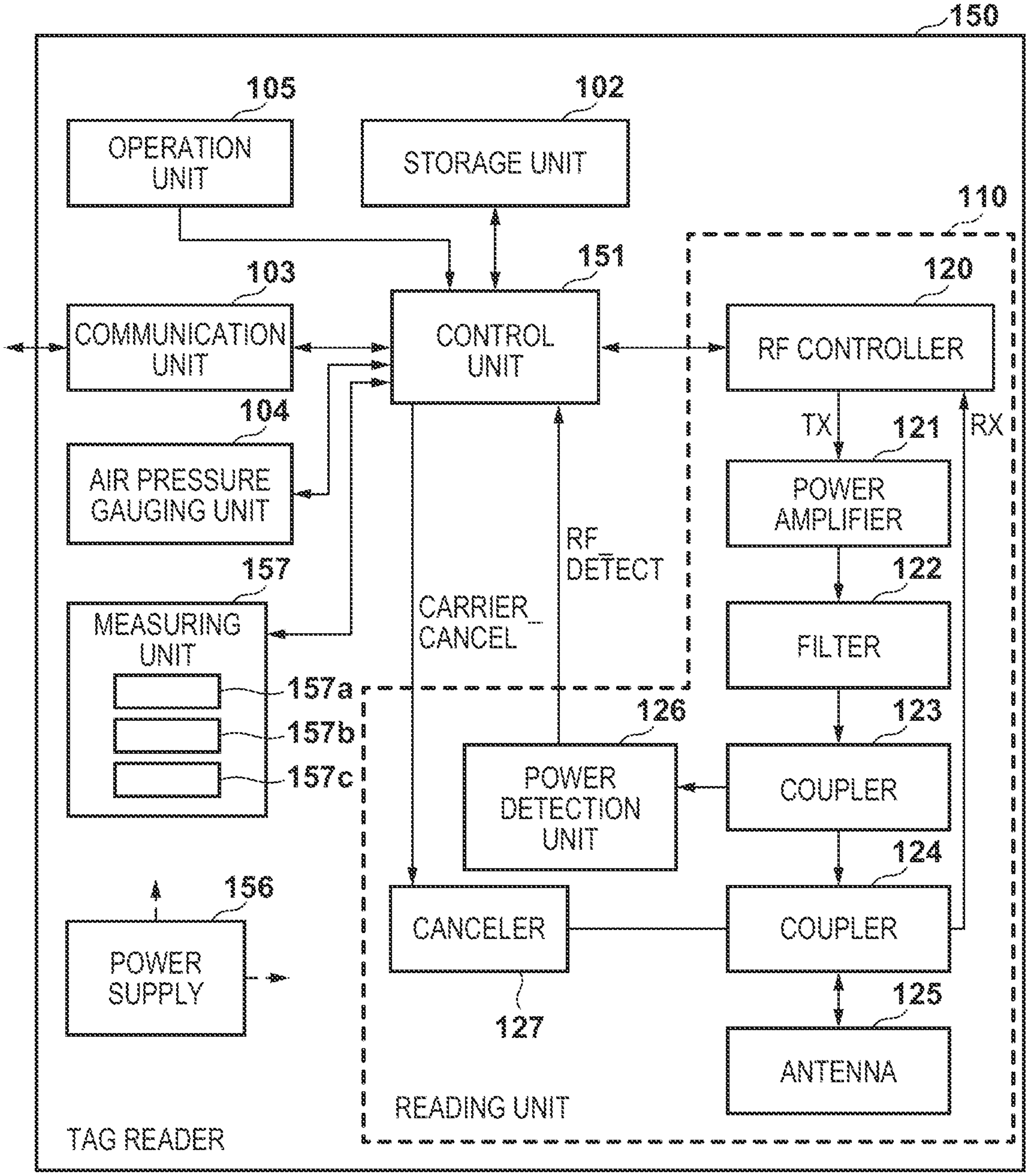
FIG. 13 is a block diagram illustrating an example of a configuration of a tag reader according to the second embodiment.

FIG. 13 is a block diagram illustrating an example of a configuration of the tag reader 150 according to the present embodiment. With reference to FIG. 13, the tag reader 150 includes a control unit 151, the storage unit 102, the communication unit 103, the air pressure gauging unit 104, the operation unit 105, a power supply 156, a measuring unit 157, and the reading unit 110.

The control unit 151 is consists of a memory to store computer programs, and one or more processors to execute the computer programs. The control unit 151 controls the overall functionality of the tag reader 150 described in this specification. For example, the control unit 151 causes the reading unit 110 to attempt reading from an RFID tag within a tag reading range. Upon detecting an RFID tag by the reading unit 110, the control unit 151 causes the air pressure gauging unit 104 to gauge the atmospheric pressure at that point in time. In parallel with the reading from the RFID tags, the control unit 151 also causes the measuring unit 157 to measure an amount of movement of the tag reader 150. Then, the control unit 151 causes the storage unit 102 to temporarily store the information read from the RFID tag, the time of reading, the gauged air pressure value, and the measured amount of movement as reading result data. After that, the control unit 151 reads out the reading result data from the storage unit 102, and transmits the read-out reading result data together with a reader ID that identifies the apparatus itself to the management server 250 via the communication unit 103.

The power supply 156 includes a battery and a DC-DC converter, and supplies power for operating the electronic circuits of the control unit 151, the storage unit 102, the communication unit 103, the air pressure gauging unit 104, the operation unit 105, the measuring unit 157, and the reading unit 110 of the tag reader 150. Although not illustrated in the figure, the tag reader 150 may have a connection terminal for connecting the tag reader 150 to an external power source for recharging the power supply 156.

The measuring unit 157 is a unit for measuring the relative amount of movement of the tag reader 150 using PDR. The measuring unit 157 continuously measures the relative amount of movement of the tag reader 150 from a given reference position while the tag reader 150 is operating, and outputs a measured value of the amount of movement to the control unit 151 in response to a request from the control unit 151. The reference position may be, for example, the position of the tag reader 150 at the point in time when the tag reader 150 is activated. The relative amount of movement of the tag reader 150 can be treated as a relative position. For example, the measuring unit 157 includes a three-axis acceleration sensor 157*a*, a gyro sensor 157*b*, and a geomagnetic sensor 157*c*. The three-axis acceleration sensor 157*a* measures acceleration acting on the tag reader 150 in a device coordinate system that is specific to the tag reader 150, and outputs first sensor data. The gyro sensor 157*b* measures an angular speed of the tag reader 150, that is, a change in attitude of the tag reader 150, and outputs second sensor data. The geomagnetic sensor 157*c* measures an orientation of the tag reader 150 in real space, and outputs third sensor data. The measuring unit 157 can measure the relative amount of movement of the tag reader 150 based on these pieces of sensor data from the sensors by converting the direction of the acceleration of the tag reader 150 into a direction in a coordinate system of the real space and integrating the converted acceleration. The measured value output from the measuring unit 157 to the control unit 151 can be a three-dimensional vector including a height direction component.

Note that instead of the tag reader 150 including the measuring unit 157, a measuring apparatus separate from the tag reader 150 (for example, carried by the user 20) may measure the amount of movement using PDR. In this case, the tag reader 150 may receive a measured value of the relative amount of movement over a communication link with the measuring apparatus.

<2-3. Configuration Example of Management Server>

<2-3-1. Basic Configuration>

Figure 14:
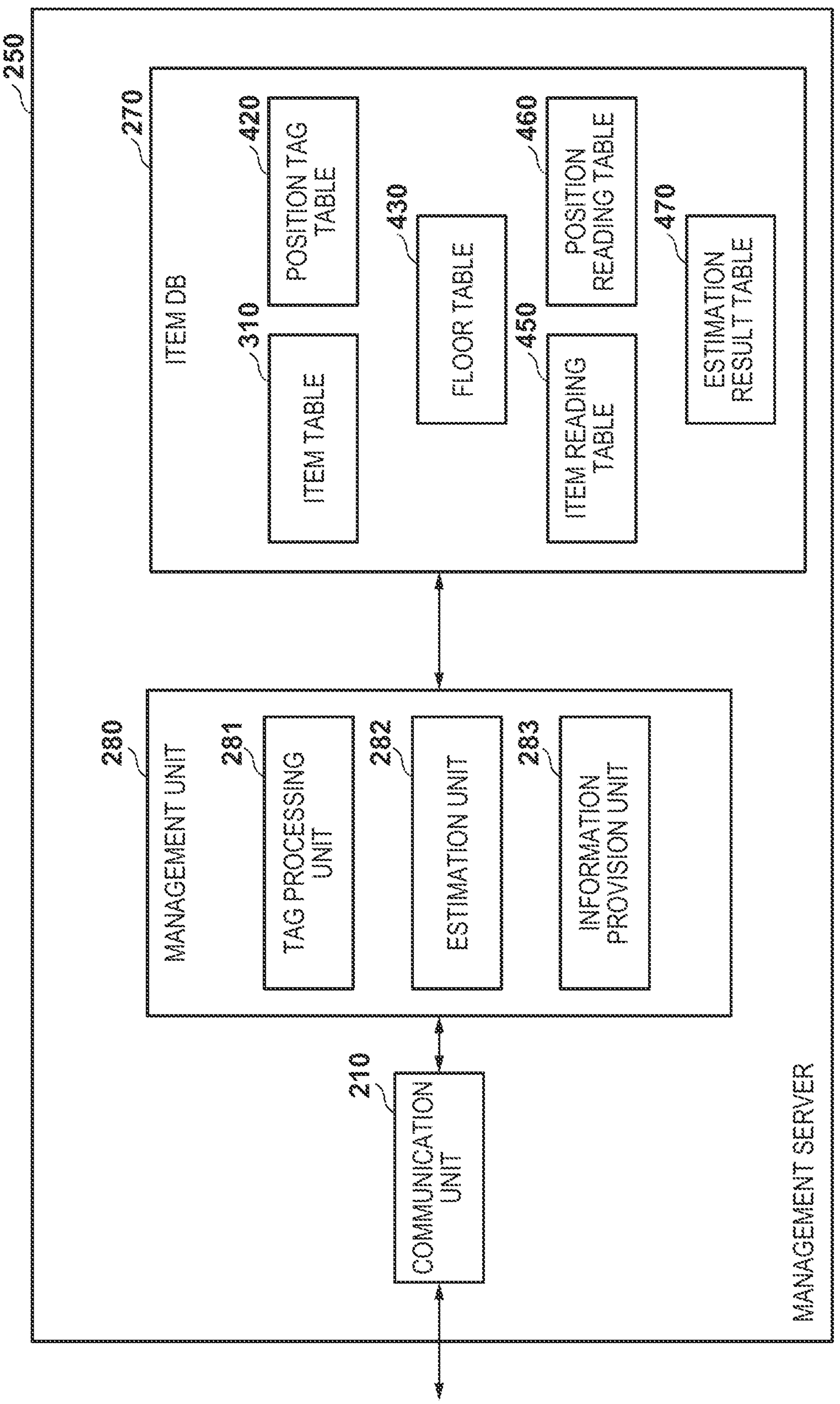
FIG. 14 is a block diagram illustrating an example of a configuration of a management server according to the second embodiment.

FIG. 14 is a block diagram illustrating an example of a configuration of the management server 250 according to the present embodiment. With reference to FIG. 14, the management server 250 includes the communication unit 210, an item DB 270, and a management unit 280.

The item DB 270 is a database that stores information regarding a location of each of the plurality of items under the management of the system. In the present embodiment, the item DB 270 includes the item table 310, a position tag table 420, a floor table 430, an item reading table 450, a position reading table 460, and an estimation result table 470. The management unit 280 is a set of software modules that provide management functions for managing data within the item DB 270. The individual software modules can run by one or more processors (not shown) of the management server 250 executing computer programs stored in a memory (not shown). In the present embodiment, the management unit 280 includes a tag processing unit 281, an estimation unit 282, and an information provision unit 283.

<2-3-2. Data Configuration Examples>

FIGS. 15A and 15B illustrate respective configuration examples of the position tag table 420 and the floor table 430 of the item DB 270.

The position tag table 420 has three data elements, namely Tag ID 321, Installation Position 422, and Floor 323. Installation Position 422 represents the three-dimensional positional coordinates of the known installation position of each position tag 40. The positional coordinates in the horizontal direction may represent a geographical location including latitude and longitude, for example, or may represent a displacement from an origin set in advance within the building. The origin of the position coordinates in the height direction may be located on a certain reference plane, such as the ground surface.

The floor table 430 has five data elements, namely Floor ID 331, Floor Number 332, Height 333, Map Image 434, and Scale 435. Map Image 434 is a data element storing map image data of each floor 10. Scale 435 represents a ratio for converting a distance on a map in Map Image 434 into a distance in the real space (for example, how many meters in the real space correspond to a single pixel in the image). Note that the map image data stored in Map Image 434 may be obtained from an external data source, or uploaded by a user and updated, at the required time.

FIGS. 16A to 16C illustrate respective configuration examples of the item reading table 450, the position reading table 460, and the estimation result table 470.

The item reading table 450 is a table for storing records of data for the item tags 50 from among the reading result data received from each tag reader 150. The item reading table 450 has six data elements, namely Record Number 351, Reader ID 352, Reading Time 353, Tag ID 354, Air Pressure 355, and Movement Amount 456. Movement Amount 456 represents a value of the relative amount of movement measured by the measuring unit 157 of the tag reader 150 at the time of reading a tag from an item tag 50.

The position reading table 460 is a table for storing records of data for the position tags 40 from among the reading result data received from each tag reader 150. The position reading table 460 has six data elements, namely Record Number 361, Reader ID 362, Reading Time 363, Tag ID 364, Air Pressure 365, and Movement Amount 466. Movement Amount 466 represents a value of the relative amount of movement measured by the measuring unit 157 of the tag reader 150 at the time of reading a tag from a position tag 40.

The estimation result table 470 is a table for storing an estimation result for a three-dimensional position of each of the items detected by each tag reader 150. The estimation result table 470 has five data elements, namely Record Number 371, Item 372, Detection Time 373, Position 474, and Floor 375. Position 474 indicates the positional coordinates of the three-dimensional position estimated by the estimation unit 282 (described below) for each estimation result record. In the present embodiment, one or both of the value of the height direction component of the positional coordinates represented by Position 474 and the value of Floor 375 may be expressed using the term "position in the height direction".

<2-3-3. Accumulating Reading Results>

The tag processing unit 281 processes reading result data received from the tag reader 150 via the communication unit 210. For example, when the reading result data is received, the tag processing unit 281 determines whether the tag ID indicated by the reading result data is an ID of an item tag 50 or an ID of a position tag 40 by referring to the item table 310 and the position tag table 420. The tag processing unit 281 then assigns a record number to the record of the reading result data indicating a tag ID of an item tag 50, and adds the record to the item reading table 450 as an item reading record. The tag processing unit 281 also assigns a record number to the record of the reading result data indicating a tag ID of a position tag 40, and adds the record to the position reading table 460 as a position reading record. In this manner, reading results of tag IDs by at least one tag reader 150 are accumulated over time in the item reading table 450 and the position reading table 460 of the item DB 270. Each of the accumulated item reading records and position reading records indicates the relative amount of movement measured at the time of reading the tag, in addition to the read tag ID read, the reading time, and the air pressure value.

<2-3-4. Estimating Position in Three Dimensions>

The estimation unit 282 estimates the position of each of the items 30 under the management of the system based on the reading results accumulated in the item reading table 450 and the position reading table 460. More specifically, in the present embodiment, the estimation unit 282 estimates the position of a target item in the horizontal direction based on the value of the relative amount of movement measured using PDR. Meanwhile, like the estimation unit 232 according to the first embodiment, the estimation unit 282 may estimate the position in the height direction of the target item based on a first air pressure value at the time of reading the tag ID from the position tag 40 and a second air pressure value at the time of reading the tag ID from the item tag 50 attached to the target item.

For example, the estimation unit 282 specifies the latest item reading record for the target item in the item reading table 450. In addition, the estimation unit 282 specifies, in the position reading table 460, a position reading record which has the same reader ID as the specified item reading record and which has the closest reading time to the reading time of the specified item reading record. When movement amount vectors indicated by the item reading record and position reading record are represented by $V_2$ and $V_1$, respectively, and the known installation position of the position tag 40 corresponding to the position reading record is represented by $V_0$, positional coordinates V of the estimated position of the target item can be calculated, for example, according to the following formula:

[Math. 6]

$$V = V_0 + (V_2 - V_1) \quad (7)$$

In other words, in the PDR-based estimation method, the estimated position of the target item can be represented by the sum of the positional coordinates of the known installation position of the position tag 40 and the relative amount of movement of the tag reader 150 from the point in time when the position tag 40 was detected to the point in time when the item tag 50 of the target item was detected. The result of such a calculation serves as the result of the position estimation at least with respect to the position in the horizontal direction.

Furthermore, the estimation unit 282 specifies, in the position reading table 460, at least one position reading record having a reading time close to the reading time of the item reading record of the target item. This position reading record may have a different reader ID from that in the item reading record. Then, the estimation unit 282 estimates the position in the height direction of the target item based on the first air pressure value indicated in the specified position reading record and the second air pressure value indicated in the item reading record. At this time, the estimation unit 282 may use either the static air pressure-height model or the dynamically-derived air pressure-height model described in the first embodiment.

For example, the estimation unit 282 can output a combination of the position in the height direction estimated based on an air pressure gauging result and a position in the horizontal direction estimated based on PDR as the three-dimensional position of the target item. In general, with a PDR-based estimation method, error accumulates and the accuracy drops over time, whereas with an air pressure-based estimation method, such error does not accumulate. Therefore, combining the two estimation methods as described above makes it possible to provide highly-accurate three-dimensional position information (in particular, height information).

As a practical example of the second embodiment, the estimation unit 282 may estimate the position in the height direction of the target item by selectively using a first estimation mode, which uses an air pressure-based estimation method, and a second estimation mode, which uses a PDR-based estimation method. As an example, the estimation unit 282 may estimate the position in the height direction of the target item using the estimation mode, among the first estimation mode and the second estimation mode, that has been specified by the user 20 or a manager. As another example, the estimation unit 282 may select the second estimation mode when it is determined that sufficient estimation accuracy cannot be achieved with the first estimation mode. For example, the estimation unit 282 may determine that sufficient estimation accuracy cannot be achieved with the first estimation mode when the number of available position reading records in the position reading table 460 (for example, appropriately corresponding to the reading time of the item tag 50 of the target item) is less than a threshold. Alternatively, the estimation unit 282 may determine that sufficient estimation accuracy cannot be achieved with the first estimation mode when the time difference between the reading time of the item reading record for the target item and the reading time of the available position reading record closest thereto in terms of time is greater than another threshold. In this manner, the robustness of the position information of the target item can be improved by complementarily using the PDR-based estimation method when the estimation accuracy of the air pressure-based estimation method is expected to drop.

Note that when the second estimation mode is selected, the estimation unit 282 may estimate the height of the target item by combining (for example, averaging or the like) the height estimated using the PDR-based estimation method with the height estimated using the air pressure-based estimation method.

After estimating the height of the target item, the estimation unit 282 may further estimate a located floor of the target item based on the estimated height. The located floor may be estimated in the same manner as the method described with reference to the estimation unit 232 according to the first embodiment.

Upon estimating the height and the located floor of the target item, the estimation unit 282 adds an estimation result record indicating the item ID, the detection time (the reading time of the item tag), the estimated position, and the located floor of the target item to the estimation result table 470. The timing at which such an estimate is made may be one or more of the timings listed with reference to the estimation unit 232 according to the first embodiment.

In an alteration example, the estimation unit 282 may have an estimation mode that determines a known position in the height direction of the position tag 40, detected immediately before by the same tag reader 150, as an estimated position in the height direction of the target item detected thereafter. For example, assume that the relative amount of movement in the height direction of the tag reader 150, from a first point in time when the tag ID of the position tag 40 was read by a given tag reader 150 to a second point in time when the tag ID of the item tag 50 was read by that tag reader 150, is less than a threshold. The threshold here may be, for example, a value sufficiently lower than the floor spacing. In this case, it is assumed that the user 20 carrying the tag reader 150 has not moved between floors 10 during the period from the first point in time to the second point in time. Therefore, in this case, estimating the position in the height direction of the target item based on the known position of the detected position tag 40 without using the air pressure-based estimation method makes it possible to reduce the computational load and output the estimation result quickly.

Figure 17A:
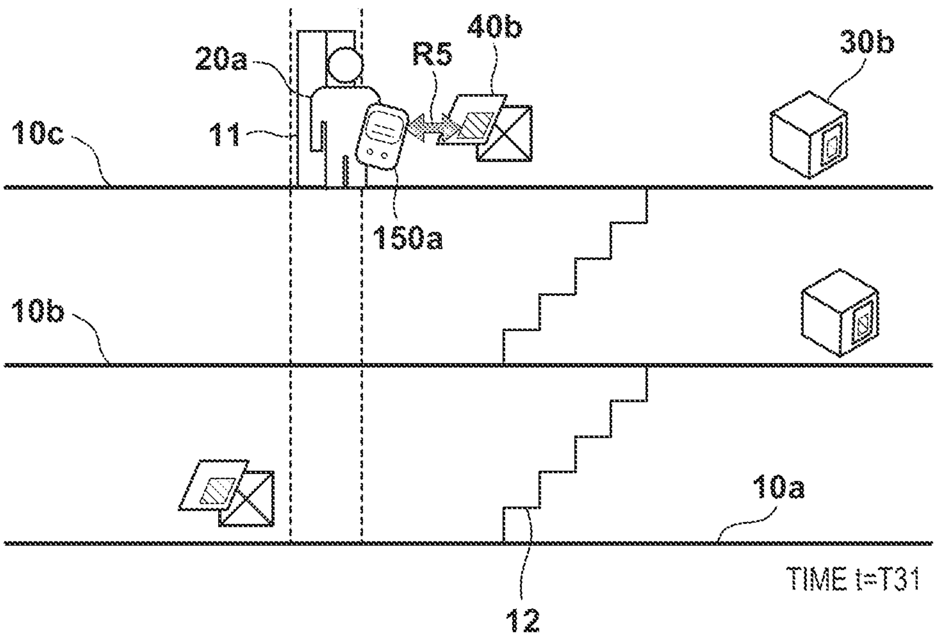
FIG. 17A is a first explanatory diagram for explaining height estimation without utilizing an air pressure-height model according to an alteration example.
Figure 17B:
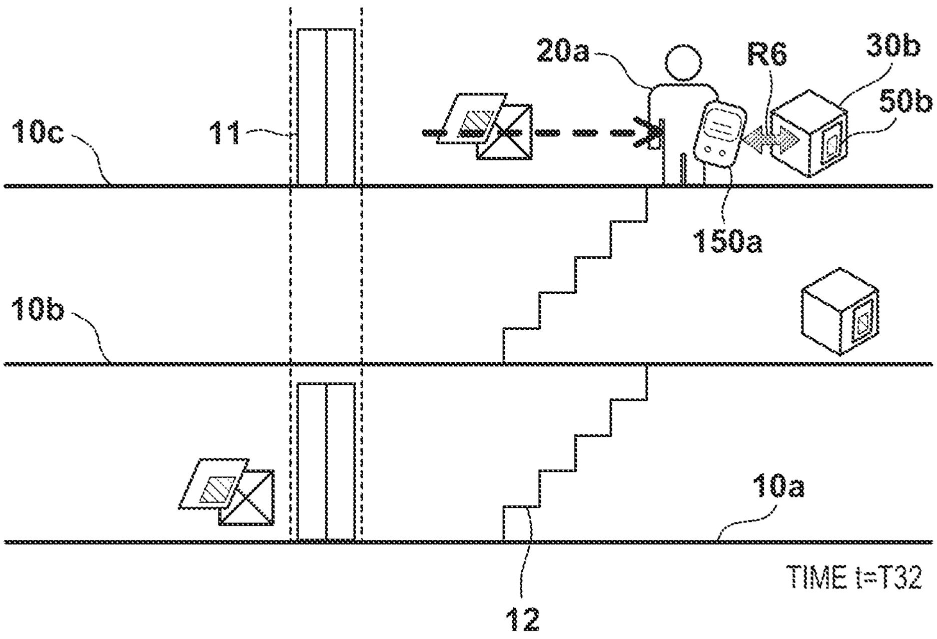
FIG. 17B is a second explanatory diagram for explaining height estimation without utilizing an air pressure-height model according to an alteration example.

FIGS. 17A and 17B illustrate examples of scenarios related to the above-described alteration example. In FIG. 17A, the user 20*a* uses the elevator 11 to ascend to the floor 10*c* corresponding to the third floor. When the user 20*a* approaches the position tag 40*b*, which is installed on the floor 10*c*, the tag reader 150*a*, which is carried by the user 20*a*, reads the tag ID from the position tag 40*b*, as indicated by arrow R5 in the figure. The reading time is T31. At this time, the tag reader 150*a* gauges the air pressure, measures the relative amount of movement, and transmits the reading result data, including the tag ID of the position tag 40*b*, the air pressure value, and the relative amount of movement, to the management server 250.

The user 20*a* then moves across the floor 10*c*, and in FIG. 17B, approaches the item 30*b*. The tag reader 150*a* then reads the tag ID from the item tag 50*b* attached to the item 30*b*, as indicated by arrow R6 in the figure. The reading time is T32. At this time, the tag reader 150*a* again gauges the air pressure, measures the relative amount of movement, and transmits the reading result data, including the tag ID of the item tag 50*b*, the air pressure value, and the relative amount of movement, to the management server 250. At this time, the user 20*a* is not moving between floors 10, and thus the relative amount of movement in the height direction of the tag reader 150*a* from the reading time T31 to the reading time T32 is less than a predefined threshold. Accordingly, the estimation unit 282 of the management server 250 can determine that the item 30*b* is located at approximately the same height as the known installation height of the position tag 40*b*, and that the item 30*b* is present on the floor 10*c* where the position tag 40*b* is installed, without using the air pressure value received from the tag reader 150.

In another alteration example, the estimation unit 282 may notify the user of the possibility of an anomaly in a tag reader 150 in a case where a deviation between the height of the target item estimated using the air pressure-based estimation method and the height of the target item estimated using the PDR-based estimation method exceeds an anomaly determination threshold. Here, the "anomaly" in the tag reader 150 may include various anomalies that can affect the air pressure value, the value of the relative amount of movement, or the time determination, such as a hardware failure, a software malfunction, incorrect parameter settings, and the like. The notification to the user may be made in any manner, such as displaying an error message in the tag reader 150 or the terminal apparatus 80, outputting a warning sound, lighting or flashing a lamp in a specific color, causing a vibrator to vibrate, or the like. In addition, the estimation unit 282 may notify the user of the possibility of an anomaly in a tag reader 150 when an air pressure value gauged at the time of reading the tag from the same position tag 40 indicates an anomalous value (for example, a value that deviates significantly from the average value of a plurality of gauging results from the past). By determining the possibility of such an anomaly and notifying the user accordingly, it is possible to stop accumulation of reading result data that would reduce accuracy of the height estimation at an early stage, and to prompt him or her to investigate the cause of the anomaly and resolve it.

<2-3-5. Providing Position Information>

The information provision unit 283 provides the information maintained in the item DB 270 to the user 20. More specifically, the information provision unit 283 may provide information regarding three-dimensional positions of items 30, estimated by the estimation unit 282 (hereinafter, simply referred to as "position information"), to the user 20 on the display of the terminal apparatus 80. For example, the information provision unit 283 may, in response to an inquiry for position information for a given target item, obtain the latest estimation result for the position of the target item and the floor on which the target item is located from the estimation result table 470, and provide that result to the user 20. Alternatively, the information provision unit 283 may, in response to an inquiry as to which items 30 are present on a given target floor, specify one or more items 30 in the estimation result table 470 of which latest located floors are that target floor, and provide a list of the specified items 30 to the user 20. Alternatively, the information provision unit 283 may extract one or more records that match conditions specified by the user 20 from the estimation result records maintained in the estimation result table 470, and provide those estimation result records to the user 20 in table format.

Figure 18:
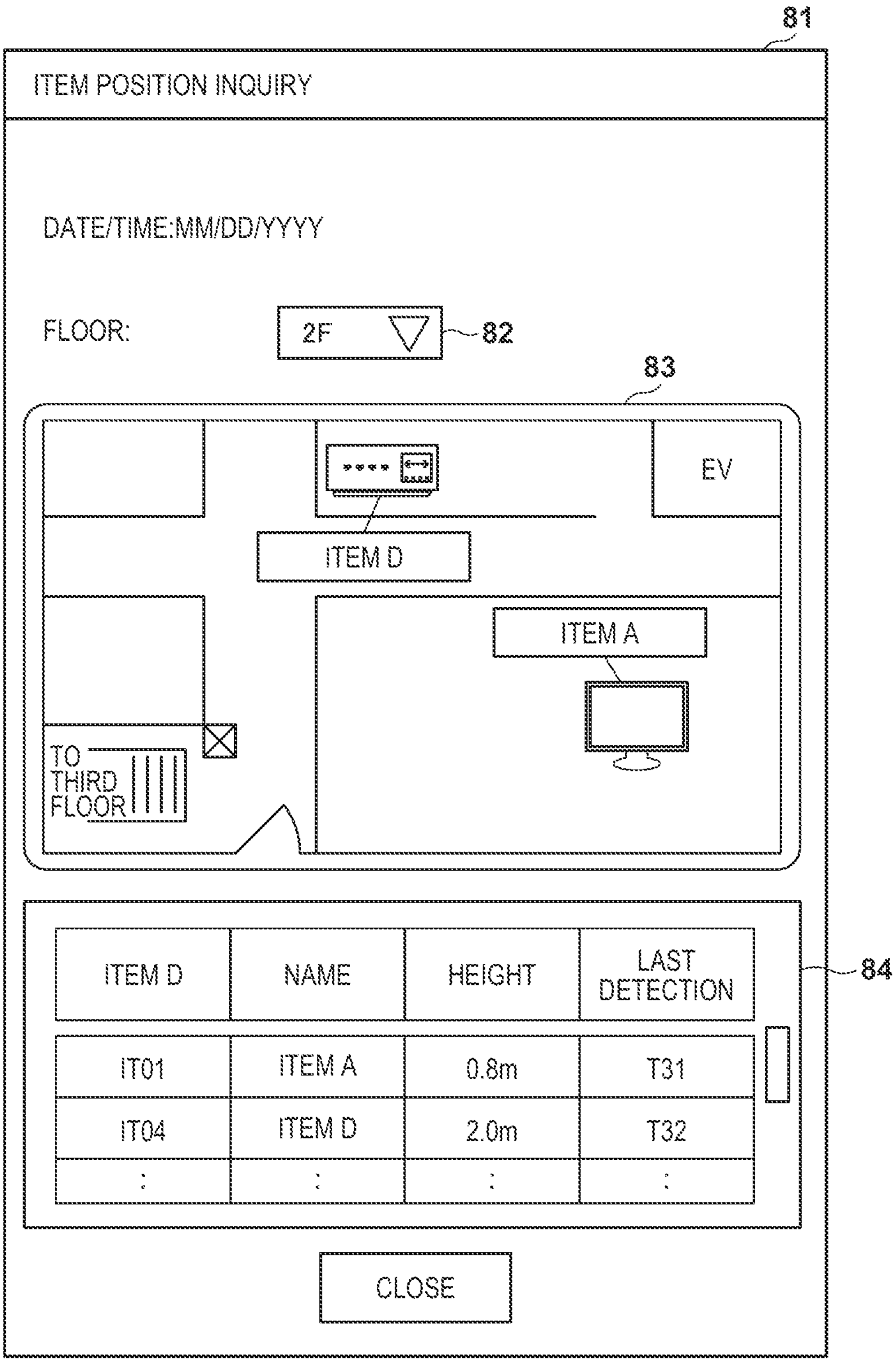
FIG. 18 is an explanatory diagram illustrating an example of a configuration of a screen that provides a user with position information.

FIG. 18 illustrates an example of an inquiry screen 81 that may be displayed in the display of the terminal apparatus 80 that provides the user 20 with the position information. The inquiry screen 81 may be displayed after the user 20 successfully logs in to the system, for example. The current date/time are displayed at the top of the screen. The inquiry screen 81 includes a floor selection field 82, a map display area 83, and an item list display area 84. The floor selection field 82 is a field (for example, a pull-down menu) for allowing the user 20 to select one of the plurality of floors 10 in the building. The map display area 83 is an area for displaying a map image of the floor 10 selected in the floor selection field 82. The information provision unit 283 displays a map image of the selected floor 10 in the map display area 83 based on the map image data and the scale obtained from the floor table 430, and superimposes item icons representing the items 30 present on the floor 10 over the map image. In the example in FIG. 18, the floor 10*b*, which is the second floor, is selected, and the item icons of two items 30, named "Item A" and "Item D", are superimposed on the map image of the floor 10*b* in the map display area 83. The information provision unit 283 may superimpose different item icons on the map image depending on the types of respective items 30, indicated in Type 314 in the item table 310. The item list display area 84 is an area for displaying, in table format, data pertaining to the items 30 present on the selected floor 10. In the example in FIG. 18, the item ID, name, height, and last detection time of each item 30 are displayed in the item list display area 84.

Note that the configuration of the screen for providing the position information to the user 20 is not limited to the example illustrated in FIG. 18. The information provision unit 283 may provide position information to the user 20 via an audio interface (for example, a speaker and a microphone) rather than on the display of the terminal apparatus 80. Alternatively, the information provision unit 283 may provide position information on the items 30 (for example, in data file format) to another system working in cooperation with the item management system 2 or other applications.

<2-4. Flow of Processing>

Figure 19:
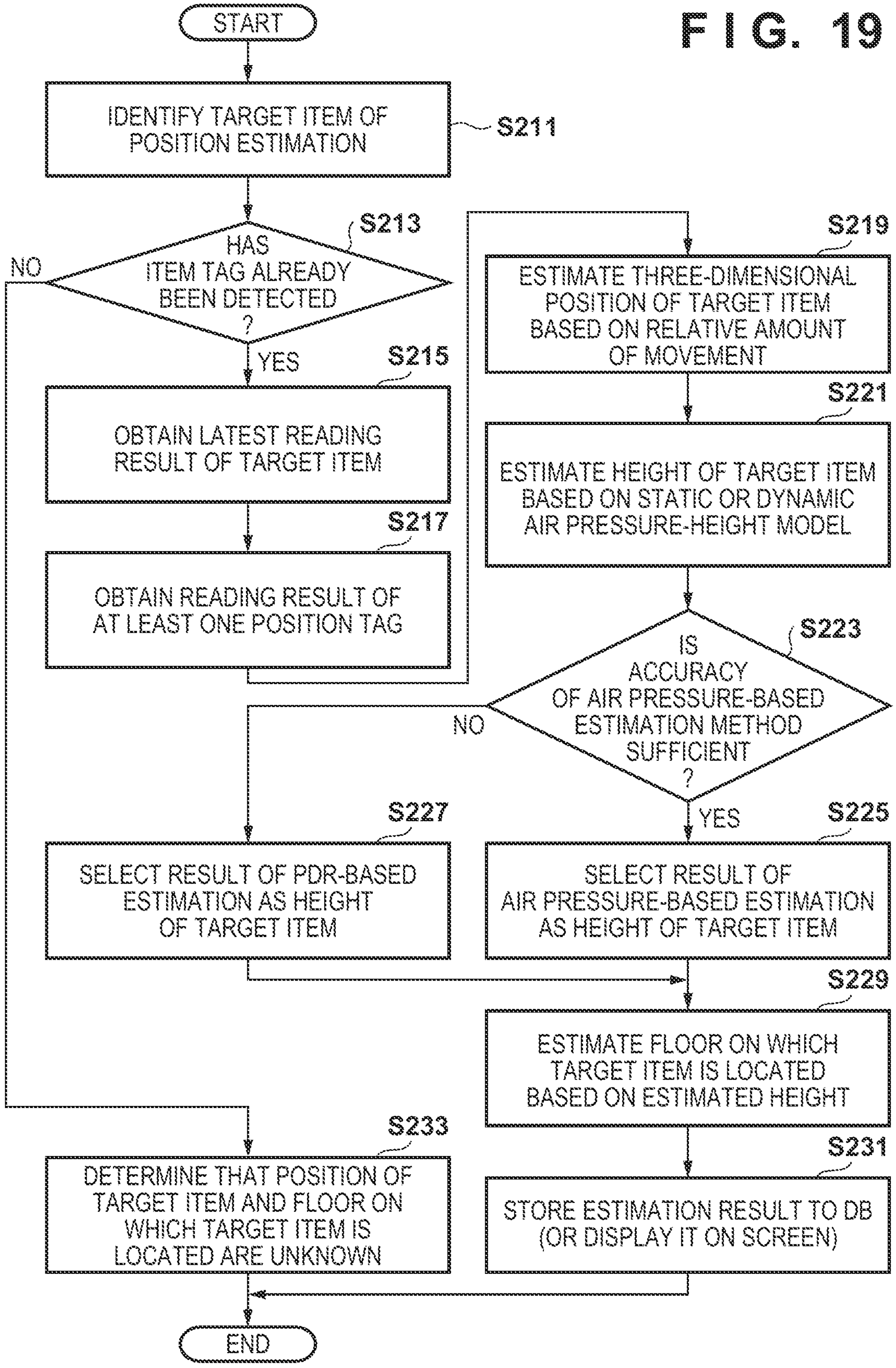
FIG. 19 is a flowchart illustrating an example of a flow of position estimation processing according to the second embodiment.

FIG. 19 is a flowchart illustrating an example of the flow of position estimation processing that can be executed by the management server 250 according to the second embodiment.

First, in S211, the estimation unit 282 identifies a target item for which the position is to be estimated. For example, the estimation unit 282 can identify an item 30 specified through an inquiry from the terminal apparatus 80, an item 30 newly detected by a tag reader 100, or each item 30 for which information is updated periodically, as the target item for which the position is to be estimated.

Next, in S213, the estimation unit 282 determines whether the identified target item has already been detected by the tag reader 150. For example, the estimation unit 282 can determine that the target item has already been detected if an item reading record for the item tag 50 attached to the target item is present in the item reading table 450. If the target item has already been detected, the sequence moves to S215. If the target item has not already been detected, the sequence moves to S233.

In S215, the estimation unit 282 obtains the latest reading result for the target item, that is, the item reading record having the newest reading time, from the item reading table 450. Next, in S217, the estimation unit 282 obtains, from the position reading table 460, a position reading record for a position tag 40 having the closest reading time to the reading time of the item reading record obtained in S215.

Next, in S219, the estimation unit 282 estimates the three-dimensional position of the target item by adding, to the known positional coordinates of the position tag 40, the difference between the relative amount of movement in the item reading record obtained in S215 and the position reading record obtained in S217 (PDR-based estimation).

Next, in S221, the estimation unit 282 estimates the height of the target item based on the static air pressure-height model or the dynamically-derived air pressure-height model described in the first embodiment (air pressure-based estimation).

Next, in S223, the estimation unit 282 evaluates the accuracy of the height estimation using the air pressure-based estimation method. For example, if the number of available position reading records is small, or if the difference in the reading time between the item reading record of the target item and the available position reading record is greater than a threshold, the accuracy of the height estimation using the air pressure-based estimation method may be determined to be insufficient. If the accuracy of the air pressure-based estimation method is determined to be sufficient, the sequence moves to S225. On the other hand, if the accuracy of the air pressure-based estimation method is determined to be insufficient, the sequence moves to S227.

In S225, the estimation unit 282 selects the result of the air pressure-based estimation made in S221 as the height of the target item (the first estimation mode). On the other hand, in S227, the estimation unit 282 selects the result of the PDR-based estimation made in S219 as the height of the target item (the second estimation mode).

Furthermore, in S229, the estimation unit 282 estimates the floor on which the target item is located based on the height of the target item selected in S225 or S227.

Next, in S231, the estimation unit 282 stores the result of the position estimation described above in the item DB 270. Specifically, the estimation unit 282 may add an estimation result record indicating the estimated three-dimensional position and the located floor of the target item to the estimation result table 470. Note that if the position estimation processing has been started in response to receiving an inquiry for position information from the terminal apparatus 80, the information provision unit 283 may transmit the result of the position estimation to the terminal apparatus 80 and display information on the estimated position and the located floor of the target item in the display.

On the other hand, if the target item has not already been detected, in S233, the estimation unit 282 determines that the height and the located floor of the target item are unknown. If the position estimation processing has been started in response to receiving an inquiry for position information from the terminal apparatus 80, the information provision unit 283 may transmit a response to the terminal apparatus 80 indicating that the position and the located floor of the target item are unknown. The position estimation processing illustrated in FIG. 19 then ends.

<2-5. Summary of Second Embodiment>

According to the second embodiment described in this section, a function for measuring a relative amount of movement from a reference position using a self-localization technique (PDR) is incorporated into at least one tag reader of the item management system according to the first embodiment. This makes it possible to estimate three-dimensional positions of target items including positions in the horizontal direction in addition to positions in the height direction.

Furthermore, according to the second embodiment, the first estimation mode based on the first air pressure value and the second air pressure value as described above, and the second estimation mode based on PDR, can be selectively used to estimate the position in the height direction of a target item. Using different estimation modes depending on the circumstances in this manner makes it possible to provide highly-accurate estimation results for various user activity situations. For example, the robustness of the height estimation can be improved by complementarily using PDR when the accuracy of air pressure-based estimation is expected to drop.

3. Third Embodiment

<3-1. System Overview>

Figure 20:
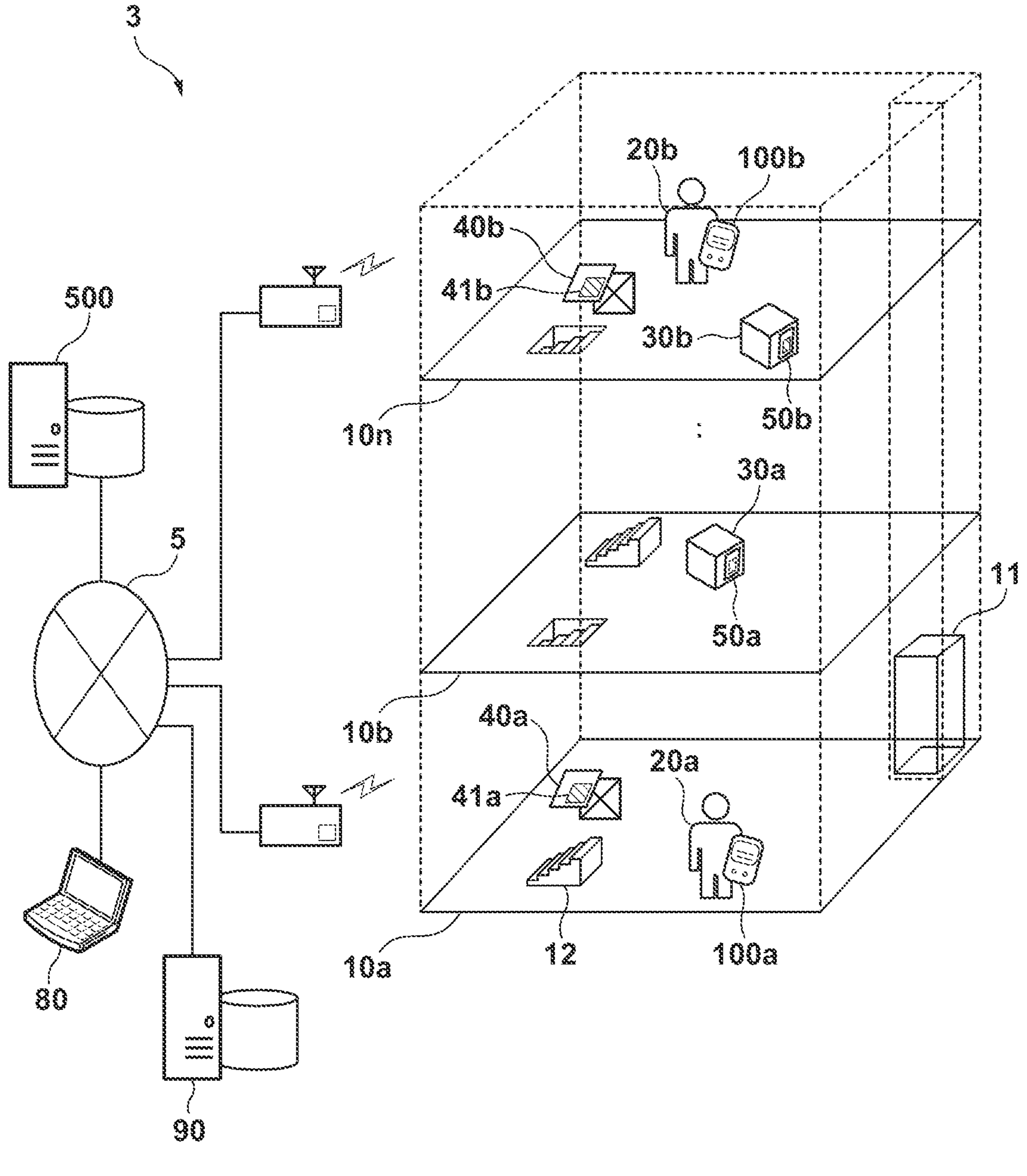
FIG. 20 is a schematic view illustrating an example of a configuration of an item management system according to a third embodiment.

FIG. 20 is a schematic view illustrating an example of a configuration of an item management system 3 according to a third embodiment. Like the item management systems 1 and 2, the item management system 3 is a system for managing the location of each of one or more items. The item management system 3 also makes use of two types of wireless devices, namely, the position tags 40 and the item tags 50, for the purpose of item management. The user 20*a* carries the tag reader 100*a*. The user 20*b* carries the tag reader 100*b*. The item management system 3 includes at least one such tag reader 100, a management server 500, the terminal apparatus 80, and an external server 90. The tag readers 100, the management server 500, the terminal apparatus 80, and the external server 90 are connected to the network 5.

Like the management server 200 according to the first embodiment, the management server 500 is an information processing apparatus that manages information regarding locations of a plurality of items 30 in a database. The management server 500 may be implemented as an application server, a database server, or a cloud server, using a high-end general-purpose computer, for example. The management server 500 receives tag reading results from the tag reader 100, and updates the database based on the received tag reading results.

The external server 90 is a server apparatus having a function of providing air pressure information indicating air pressure values by time, at various points in the real space, in response to a request from a client. The external server 90 is an apparatus external to the management server 500. The external server 90 may be a weather information server operated by a third party, for example. The present embodiment assumes that the external server 90 is capable of providing air pressure information of at least a nearby point of positions at which the position tags 40 are installed, to the management server 500 in response to a request received from the management server 500.

<3-2. Configuration Example of Management Server>

<3-2-1. Basic Configuration>

Figure 21:
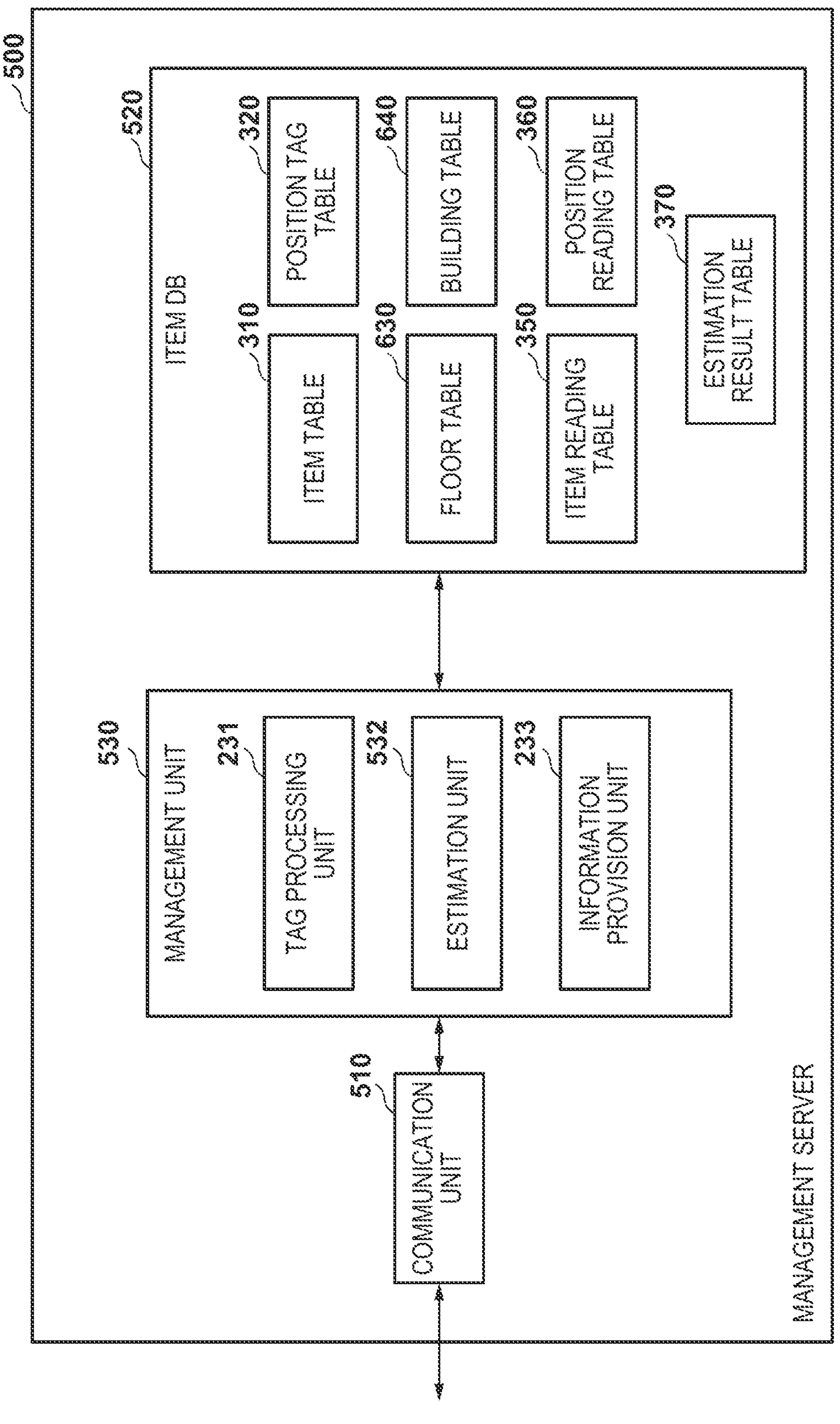
FIG. 21 is a block diagram illustrating an example of a configuration of a management server according to the third embodiment.

FIG. 21 is a block diagram illustrating an example of a configuration of the management server 500 according to the present embodiment. With reference to FIG. 21, the management server 500 includes a communication unit 510, an item DB 520, and a management unit 530.

The communication unit 510 is a communication interface for the management server 500 to communicate with other apparatuses. The communication unit 510 may be a wired communication interface or a wireless communication interface. In the present embodiment, the communication unit 510 communicates with the tag readers 100, the terminal apparatus 80, and the external server 90. The item DB 520 is a database that stores information regarding a location of each of the plurality of items under the management of the system. In the present embodiment, the item DB 520 includes the item table 310, the position tag table 320, a floor table 630, a building table 640, the item reading table 350, the position reading table 360, and the estimation result table 370. The management unit 530 is a set of software modules that provide management functions for managing data within the item DB 520. The individual software modules can run by one or more processors (not shown) of the management server 500 executing computer programs stored in a memory (not shown). In the present embodiment, the management unit 530 includes the tag processing unit 231, an estimation unit 532, and the information provision unit 233.

<3-2-2. Data Configuration Examples>

FIGS. 22A and 22B illustrate respective configuration examples of the floor table 630 and the building table 640 of the item DB 520.

The floor table 630 has four data elements, namely Floor ID 331, Floor Number 332, Height 333, and Building 634. Building 634 indicates to which building each of the floors 10 identified by the value in Floor ID 331 belongs by a value of Building ID 641 of the building table 640 (described below). In the example in FIG. 22A, the three floors 10 identified by floor IDs "PL01", "PL02", and "PL03" all belong to the same building identified by a building ID "BD01".

The building table 640 has three data elements, namely Building ID 641, Location 642, and Name 643. Building ID 641 is identification information that uniquely identifies each of the buildings. Location 642 represents two-dimensional positional coordinates (for example, latitude and longitude) of a known geographical location of each building. Name 643 represents the name of each building. In the example in FIG. 22B, three buildings identified by building IDs "TG01", "TG02", and "TG03" are given the names "Facility A", "Facility B", and "Facility C", respectively. The values of Location 642 and Name 643 of each building are determined by a user 20 or a manager, and may be registered in advance through a user interface provided by the management unit 530.

<3-2-3. Estimating Height>

The estimation unit 532 estimates the position in the height direction of each of the items 30 under the management of the system based on the reading results accumulated in the item reading table 350 and the position reading table 360. More specifically, the estimation unit 532 estimates a position in the height direction of a target item based on a first air pressure value at the time of reading a tag ID from a position tag 40 by at least one tag reader 100 and a second air pressure value at the time of reading the tag ID from the item tag 50 attached to the target item.

For example, the estimation unit 532 specifies, in the position reading table 360, at least one position reading record having a reading time close to the reading time of the item reading record of the target item. The position reading record may have a different reader ID from that in the item reading record. Then, the estimation unit 532 estimates the position in the height direction of the target item based on the first air pressure value $P_1$ indicated in the specified position reading record and the second air pressure value $P_2$ indicated in the item reading record. At this time, the estimation unit 532 may use either the static air pressure-height model or the dynamically-derived air pressure-height model described in the first embodiment.

If a first reading time $T_1$ at which the tag ID was read from the position tag 40 does not match or is not close enough in time to a second reading time $T_2$ at which the tag ID was read from the item tag 50 of the target item, the estimation unit 532 corrects the first air pressure value $P_1$ before applying that value to the air pressure-height model. More specifically, the estimation unit 532 obtains the positional coordinates of the building to which the floor 10 where the position tag 40 is installed belongs from the building table 640, specifies the obtained positional coordinates and the time $T_1$ and the time $T_2$, and requests the external server 90 to provide air pressure information. The external server 90 returns, to the management server 500, air pressure information indicating air pressure values $P_{E1}$ and $P_{E2}$ at the times $T_1$ and $T_2$ at the point represented by the positional coordinates included in the request. The estimation unit 532 receives the air pressure information provided in this manner from the external server 90 via the communication unit 510. Then, using the air pressure values $P_{E1}$ and $P_{E2}$ indicated by the received air pressure information, the estimation unit 532 corrects the first air pressure value $P_1$, which is to be applied to the air pressure-height model, to an air pressure value $P_1'$ corresponding to the time $T_2$, according to the following formula, for example:

[Math. 7]

$$P_1' = P_1 + (P_{E2} - P_{E1}) \tag{8}$$

The estimation unit 532 estimates the position in the height direction of the target item by applying the first air pressure value $P_1'$ corrected in this manner and the second air pressure value $P_2$ to the air pressure-height model.

After estimating the height of the target item, the estimation unit 532 may further estimate a located floor of the target item based on the estimated height. The located floor may be estimated in the same manner as the method described with reference to the estimation unit 232 according to the first embodiment.

Upon estimating the height and the located floor of the target item, the estimation unit 532 adds an estimation result record indicating the item ID, the detection time (the reading time of the item tag), the estimated height, and the located floor of the target item to the estimation result table 370. The timing at which such an estimate is made may be one or more of the timings listed with reference to the estimation unit 232 according to the first embodiment.

<3-3. Flow of Processing>

Figure 23:
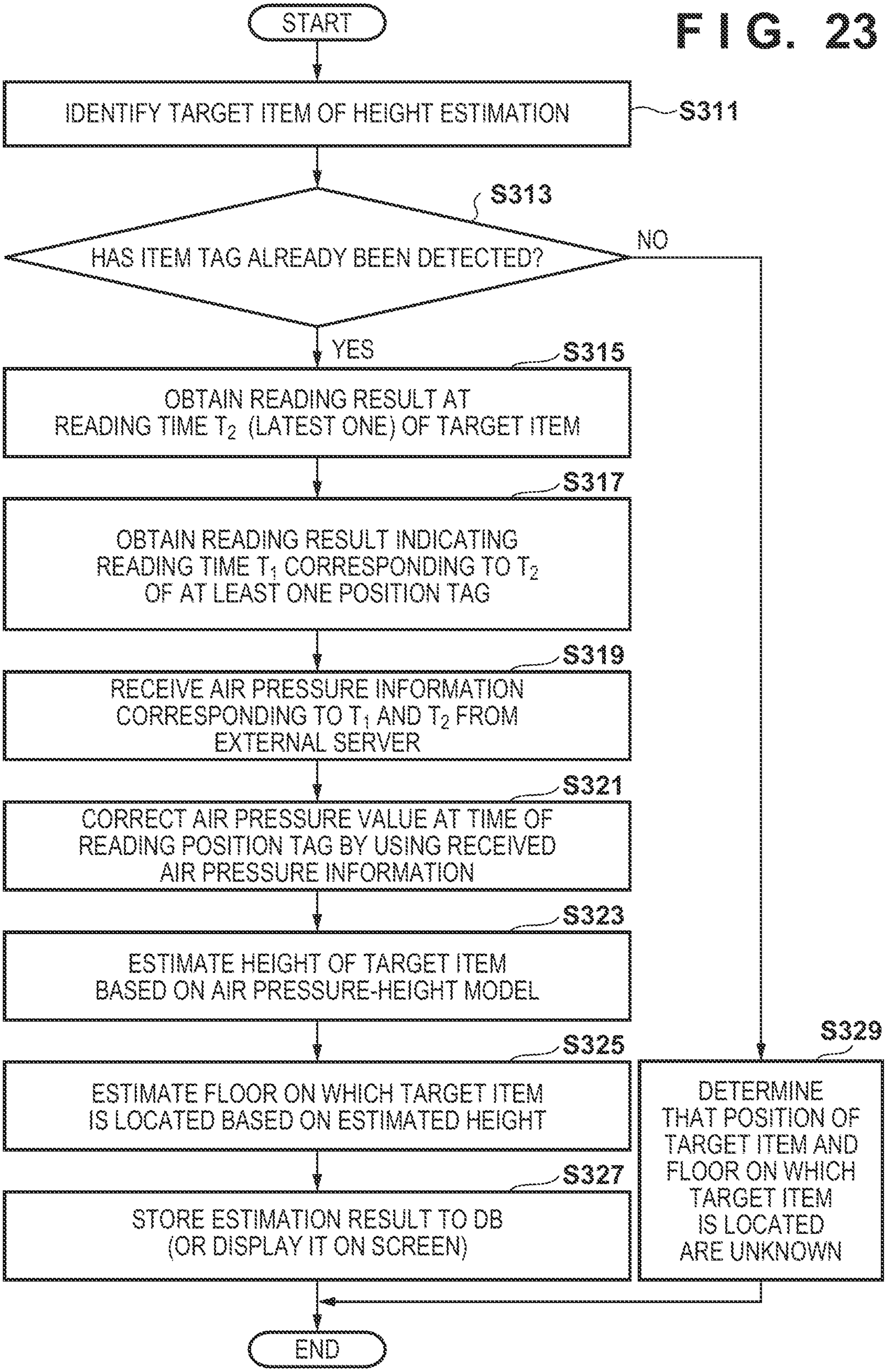
FIG. 23 is a flowchart illustrating an example of a flow of height estimation processing according to the third embodiment.

FIG. 23 is a flowchart illustrating an example of the flow of height estimation processing that can be executed by the management server 500 according to the third embodiment.

First, in S311, the estimation unit 532 identifies a target item for which the height is to be estimated. For example, the estimation unit 532 can identify an item 30 specified through an inquiry from the terminal apparatus 80, an item 30 newly detected by a tag reader 100, or each item 30 for which information is updated periodically, as the target item for which the height is to be estimated.

Next, in S313, the estimation unit 532 determines whether the identified target item has already been detected by the tag reader 100. For example, the estimation unit 532 can determine that the target item has already been detected if an item reading record for the item tag 50 attached to the target item is present in the item reading table 350. If the target item has already been detected, the sequence moves to S315. If the target item has not already been detected, the sequence moves to S329.

In S315, the estimation unit 532 obtains an item reading record having the newest reading time for the target item from the item reading table 350. The reading time of the item reading record obtained here is assumed to be $T_2$, and the air pressure value is assumed to be $P_2$.

Next, in S317, the estimation unit 532 obtains, from the position reading table 360, a position reading record for at least one position tag 40 having a reading time corresponding to the reading time $T_2$ in the item reading record obtained in S315. The reading time of the position reading record obtained here is assumed to be $T_1$, and the air pressure value is assumed to be $P_1$.

Next, in S319, the estimation unit 532 makes a request to the external server 90 for the air pressure information for the reading times $T_1$ and $T_2$ at a point near the known installation position of the position tag 40 corresponding to at least one position reading record obtained in S317, and receives the air pressure information from the external server 90.

Next, in S321, the estimation unit 532 corrects the air pressure value $P_1$ at the time of reading the tag ID from each position tag 40, using the air pressure value $P_{E1}$ at the reading time $T_1$ and the air pressure value $P_{E2}$ at the reading time $T_2$, indicated by the received air pressure information.

Next, in S323, the estimation unit 532 estimates the height of the target item based on the static air pressure-height model or the dynamically-derived air pressure-height model described in the first embodiment. Furthermore, in S325, the estimation unit 532 estimates the floor on which the target item is located based on the height of the target item estimated in S323.

The processing in S327 and S329 may be the same as that in S123 and S125 in FIG. 10, described in connection with the first embodiment, and thus descriptions thereof will be omitted here.

<3-4. Summary of Third Embodiment>

According to the third embodiment described in this section, a communication function that communicates with an external apparatus capable of providing air pressure information indicating air pressure values per time frame basis at various points is incorporated into the management server of the item management system according to the first embodiment. Then, air pressure information regarding a first reading time at which a tag ID was read from a position tag and a second reading time at which a tag ID was read from an item tag of a target item may be provided by the external apparatus, and the first air pressure value can be corrected based on the provided air pressure information. The correction is performed by correcting the first air pressure value to a value corresponding to the second reading time based on the provided air pressure information, and the position in the height direction of the target item is estimated based on the corrected first air pressure value and the second air pressure value. According to this configuration, even if fluctuations in environmental factors during the period between the first reading time and the second reading time may affect the estimation of the height, the position in the height direction of the target item can be estimated with good accuracy having canceled out that effect.

As an alteration example of the third embodiment, the air pressure value indicated by the air pressure information provided by the external apparatus may be used to estimate the height of the target item, instead of the first air pressure value gauged by the tag reader at the time of reading the tag ID from the position tag. In this case, for example, the air pressure value $P_1$ and the installation height $H_1$ of the position tag 40 in Formula (1) indicated above can be replaced with the air pressure value indicated by the air pressure information and the height of the ground surface (for example, zero), respectively.

4. Conclusion

Thus far, various embodiments, practical examples, and alteration examples of the technology according to the present disclosure have been described in detail with reference to FIGS. 1 to 23. The features of the above-described embodiments, practical examples, and alteration examples may be combined with each other in any way. For example, when estimating the position of the target item as described in the second embodiment, the air pressure value gauged at the time of reading the tag ID from the position tag may be corrected based on the air pressure information provided by the external apparatus as described in the third embodiment. Additionally, the information provision unit 233 according to the first or third embodiment may provide height information to the user via a graphical user interface (GUI) such as the inquiry screen 81 described with reference to FIG. 18. Additionally, in the first and second embodiments, data associating each floor 10 with the building to which the floor belongs may be maintained in a database, such as the floor table 630 and the building table 640 according to the third embodiment. In this case, the users, the tag readers, and the items may move among buildings.

In any of the embodiments, each of the position tags and the item tags may be an RFID tag, and the tag reader can read information that is sent back from the RFID tag by using the energy of electromagnetic waves emitted into the reading range. In this case, it is not necessary to install batteries and complex transmitters/receivers in each tag, making it possible to introduce the height estimation system described above at a low cost even in a situation where there are a large number of items under the management of the item management system.

According to the present invention, it will be possible to get to efficiently know a position of an item in a height direction while suppressing a cost.

5. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An item management system comprising:

at least one first wireless device installed at a known position and storing first identification information;

a second wireless device attached to an item and storing second identification information;

at least one tag reader that moves together with a mobile object and includes (i) a wireless tag reader capable of reading, from the at least one first wireless device and the second wireless device, identification information stored in the at least one first wireless device and the second wireless device and (ii) a barometric pressure sensor; and at least one processor configured to estimate a position of the item in a height direction based on a first air pressure value gauged when the at least one tag reader has read the first identification information from the at least one first wireless device and a second air pressure value gauged when the at least one tag reader has read the second identification information from the second wireless device.

2. The item management system according to claim 1, wherein the item management system further comprises a database in which reading results received from each tag reader are accumulated, each reading result including read identification information, a reading time, and an air pressure value gauged when the identification information has been read; and wherein the at least one processor is further configured to obtain, from the database, a reading result for the first identification information that indicates a reading time corresponding to a time at which the second identification information has been read from the second wireless device, and estimate a position of the item in a height direction based on the first air pressure value indicated by the obtained reading result, the second air pressure value, and the known position of the first wireless device corresponding to the obtained reading result.

3. The item management system according to claim 1, wherein the item management system includes at least two first wireless devices installed at different heights, and wherein the at least one processor is further configured to derive a relational expression between an air pressure and a height based on the first air pressure values respectively gauged when the first identification information has been read from the at least two first wireless devices and known heights of the at least two first wireless devices, and estimate a position of the item in a height direction by applying the second air pressure value to the derived relational expression.

4. The item management system according to claim 3, wherein the at least one processor is further configured to derive the relational expression between an air pressure and a height further based on a time difference between a first reading time at which the first identification information was read and a second reading time at which the second identification information was read.

5. The item management system according to claim 1, wherein the item management system further comprises a communication interface configured to communicate with an external apparatus that is capable of providing air pressure information indicating an air pressure value per time frame basis for at least a nearby point from the known position, and wherein the at least one processor is further configured to receive the air pressure information regarding a first reading time at which the first identification information was read and a second reading time at which the second identification information was read, correct the first air pressure value into a value corresponding to the second reading time based on the received air pressure information, and estimate the position of the item in a height direction based on the corrected first air pressure value and the second air pressure value.

6. The item management system according to claim 1, wherein the at least one tag reader further includes a motion sensor configured to measure a relative amount of movement from a reference position using a self-localization technique.

7. The item management system according to claim 6, wherein the at least one processor is further configured to estimate the position of the item in a height direction selectively using a first estimation mode based on the first air pressure value and the second air pressure value and a second estimation mode based on the self-localization technique.

8. The item management system according to claim 7, wherein the at least one processor is further configured to select the second estimation mode in a case where it is determined that an estimation accuracy of the first estimation mode is not sufficient.

9. The item management system according to claim 6, wherein, in a case where the at least one processor has estimated the position of the item in a height direction based on the first air pressure value and the second air pressure value, the at least one processor is further configured to output, as a three-dimensional position of the item, a combination of the estimated position in a height direction and a position of the item in a horizontal direction estimated based on the relative amount of movement measured using the self-localization technique.

10. The item management system according to claim 6, wherein, in a case where a relative amount of movement in a height direction of the tag reader between a point in time at which the tag reader has read the first identification information from the first wireless device and a point in time at which the tag reader has read the second identification information from the second wireless device is smaller than a threshold, the at least one processor is further configured to estimate a position of the item in a height direction from a known position in a height direction of the first wireless device without being based on the first air pressure value and the second air pressure value.

11. The item management system according to claim 6, wherein the at least one processor is further configured to notify a user of a possibility of an anomaly of the at least one tag reader in a case where a deviation between a height of the item estimated based on the first and second air pressure values and a height of the item estimated based on the self-localization technique exceeds a threshold.

12. The item management system according to claim 1, wherein the at least one processor is further configured to estimate, as the position in a height direction, an absolute height of the item, a relative height of the item with respect to a reference plane, or a floor on which the item is located in a building having a plurality of floors.

13. The item management system according to claim 1, wherein the wireless devices are radio frequency identification (RFID) tags, and the at least one tag reader is configured to emit an electromagnetic wave to a reading range and read information sent back from the wireless device utilizing energy of the electromagnetic wave.

14. A method of estimating a position of an item in a height direction using at least one tag reader that moves together with a mobile object and includes (i) a wireless tag reader capable of reading, from a wireless device, identification information stored in the wireless device and (ii) a barometric pressure sensor, the method comprising:

reading, by the wireless tag reader, first identification information from at least one first wireless device installed at a known position and storing the first identification information;

gauging, by the barometric pressure sensor, air pressure to output a first air pressure value at the time of reading the first identification information;

reading, by the wireless tag reader, second identification information from a second wireless device attached to the item and storing the second identification information; gauging, by the barometric pressure sensor, air pressure to output a second air pressure value at the time of reading the second identification information; and estimating a position of the item in a height direction based on the first air pressure value and the second air pressure value.

15. A tag reader comprising:

a wireless tag reader configured to read, from a wireless device, identification information stored in the wireless device;

a barometric pressure sensor; and a control unit configured to control reading of information by the wireless tag reader and gauging of air pressure by the barometric pressure sensor, wherein the control unit is configured to:

cause the wireless tag reader to read first identification information from at least one first wireless device installed at a known position and storing the first identification information;

cause the barometric pressure sensor to gauge air pressure to output a first air pressure value at the time of reading the first identification information;

cause the wireless tag reader to read second identification information from a second wireless device attached to an item and storing the second identification information; and cause the barometric pressure sensor to gauge air pressure to output a second air pressure value at the time of reading the second identification information, and wherein the first air pressure value and the second air pressure value are used for estimating a position of the item in a height direction.

* * * * *